United States Patent [19]
Szczech et al.

[11] Patent Number: 6,120,879
[45] Date of Patent: Sep. 19, 2000

[54] DUAL USE REFLECTIVE ARTICLE

[75] Inventors: Theodore J. Szczech, Woodbury, Minn.; Toshitaka Nakajima, Nishimurayama-gun, Japan; Mark D. Fiegen, Roseville, Minn.

[73] Assignee: 3M Innovative Properties Company, St. Paul, Minn.

[21] Appl. No.: 09/058,386

[22] Filed: Apr. 9, 1998

Related U.S. Application Data

[63] Continuation-in-part of application No. 08/937,532, Sep. 25, 1997, abandoned.

[51] Int. Cl.[7] .............................. B32B 3/00; G02B 5/124; G09F 13/16
[52] U.S. Cl. .......................... 428/156; 428/913; 359/530; 40/582
[58] Field of Search .................................. 428/156, 167, 428/913, 212, 141; 359/529, 530; 40/541, 582

[56] References Cited

U.S. PATENT DOCUMENTS

| | | |
|---|---|---|
| 1,671,086 | 5/1928 | Stimson . |
| 2,310,790 | 2/1943 | Jungerson . |
| 3,712,706 | 1/1973 | Stamm ..................................... 350/103 |

(List continued on next page.)

FOREIGN PATENT DOCUMENTS

| | | |
|---|---|---|
| 2111161 | 6/1994 | Canada . |
| 0 790 120 A2 | 8/1997 | European Pat. Off. . |
| 0 825 461 | 2/1998 | European Pat. Off. . |
| 6-289207 | 10/1994 | Japan . |
| 2 207 526 | 2/1989 | United Kingdom . |
| WO 94/14091 | 6/1994 | WIPO . |
| WO 95/11470 | 4/1995 | WIPO .............................. G02B 5/124 |
| WO 96/04638 | 2/1996 | WIPO . |
| WO 96/30786 | 10/1996 | WIPO . |
| WO 97/04940 | 2/1997 | WIPO . |
| WO 97/05509 | 2/1997 | WIPO .............................. G02B 5/124 |
| WO 97/26567 | 7/1997 | WIPO .............................. G02B 5/124 |

OTHER PUBLICATIONS

Woltman, H.L. et al., "Sign Luminance as a Methodology for Matching Driver Needs, Roadway Variables, and Signing Materials," *Transportation Research Record 1213*, National Research Council, Washington, D.C., 1989.

Minato, Atsushi et al., "Optical Design of Cube–Corner Retroreflectors Having Curved Mirror Surfaces," *Applied Optics*, Oct. 1, 1992, vol. 31, No. 28.

Eckhardt, H.D., "Simple Model of Corner Reflector Phenomena," *Applied Optics*, Jul., 1971, vol. 10, No. 7.

Woltman, H.L. et al., "Sign Luminance as a Methodology for Matching Driver Needs, Roadway Variables, and Signing Materials," *Transportation Research Record 1213*, National Research Council, Washington, D.C.

Yoder, P.R. Jr., "Study of Light Deviation Errors in Triple Mirrors and Tetrahedral Prisms," *Journal of the Optical Society of America*, vol. 48, No. 7, Jul. 1958.

*Primary Examiner*—Donald Loney
*Attorney, Agent, or Firm*—Stephen C. Jensen; Rudolph P. Hofmann, Jr.

[57] ABSTRACT

A reflective article has a structured surface which includes a first and second array of reflective elements. The first array includes elements which have at least a first, second, and third reflecting face arranged to retroreflect incident light in a retroreflected beam. The second array includes elements which have at least a fourth, fifth, and sixth reflecting face arranged to reflect incident light in a second beam at an observation angle greater than 2 degrees. In signing applications, the second beam can be light originating from a stationary light source, the second beam having a direction and beam width suitable for illuminating an observation zone of interest. The retroreflected beam can be light originating from a moving light source such as a vehicle headlamp. Sheeting comprising such an article can be used both where external lighting from a suitable stationary light source is available and where it is not available.

21 Claims, 23 Drawing Sheets

U.S. PATENT DOCUMENTS

| | | | |
|---|---|---|---|
| 3,833,285 | 9/1974 | Heenan | 350/103 |
| 4,066,331 | 1/1978 | Lindner | 350/103 |
| 4,149,304 | 4/1979 | Brynjegard | 29/148.4 |
| 4,526,439 | 7/1985 | Okoshi et al. | 350/128 |
| 4,576,850 | 3/1986 | Martens | 428/156 |
| 4,588,258 | 5/1986 | Hoopman | 350/103 |
| 4,775,219 | 10/1988 | Appeldorn et al. | 350/103 |
| 4,895,428 | 1/1990 | Nelson et al. | 350/103 |
| 4,938,563 | 7/1990 | Nelson et al. | 350/103 |
| 4,989,948 | 2/1991 | Dreyer, Jr. | 359/97 |
| 5,122,902 | 6/1992 | Benson | 359/529 |
| 5,122,939 | 6/1992 | Kazdan et al. | 362/243 |
| 5,138,488 | 8/1992 | Szczech | 359/529 |
| 5,171,624 | 12/1992 | Walter | 428/156 |
| 5,175,030 | 12/1992 | Lu et al. | 428/30 |
| 5,182,663 | 1/1993 | Jones | 359/70 |
| 5,183,597 | 2/1993 | Lu | 264/1.4 |
| 5,202,743 | 4/1993 | Lund et al. | 356/5 |
| 5,557,836 | 9/1996 | Smith et al. | 29/527.4 |
| 5,558,740 | 9/1996 | Bernard et al. | 156/231 |
| 5,564,870 | 10/1996 | Benson et al. | 409/131 |
| 5,600,484 | 2/1997 | Benson et al. | 359/529 |
| 5,706,132 | 1/1998 | Nestegard et al. | 359/530 |
| 5,844,712 | 12/1998 | Caroli | 359/530 |
| 5,936,770 | 8/1999 | Nestegard et al. | 359/530 |

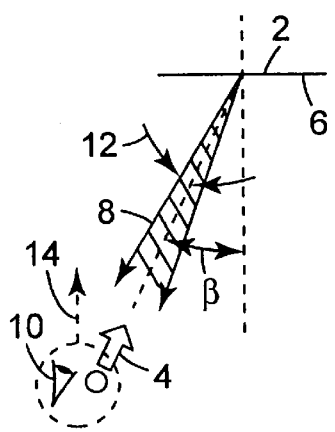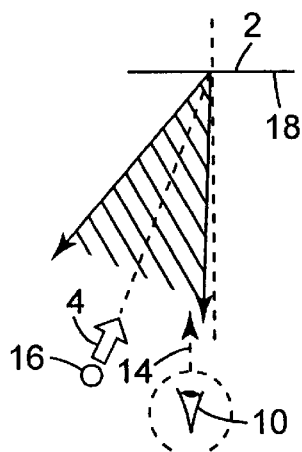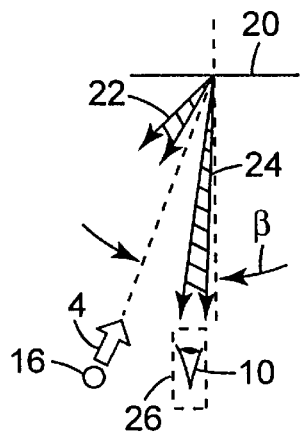
*Fig. 1A*  *Fig. 1B*  *Fig. 1C*
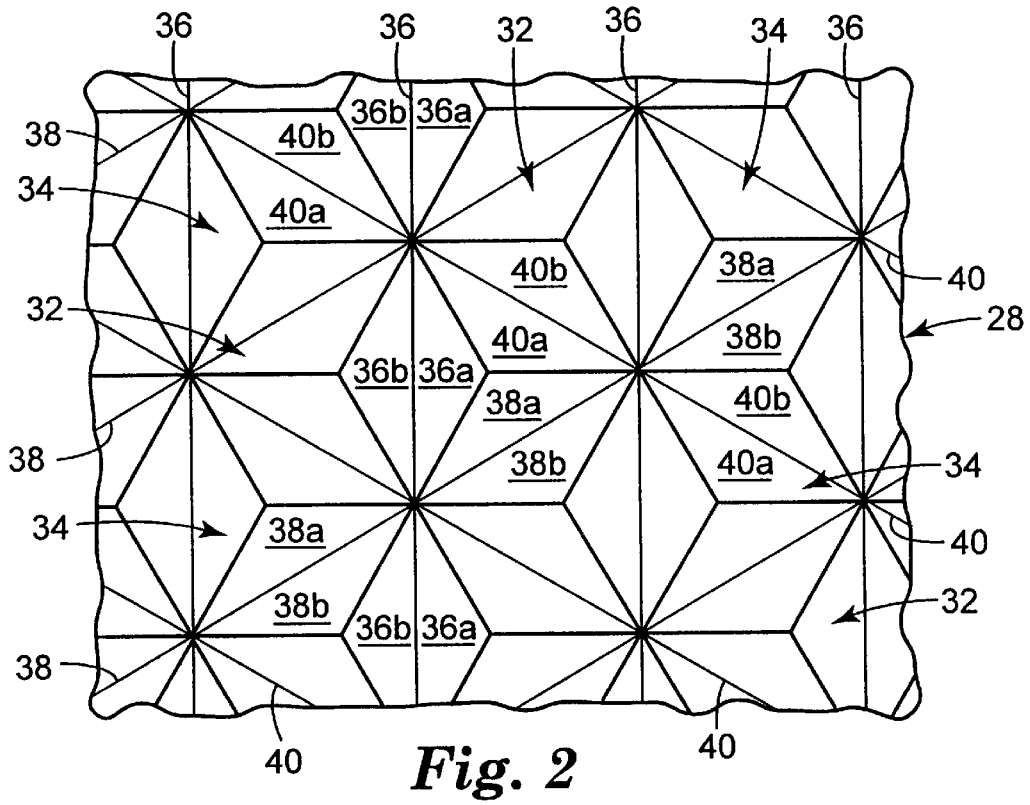
*Fig. 2*
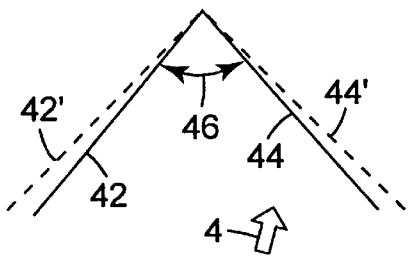
*Fig. 3*

DUAL USE REFLECTIVE ARTICLE

CROSS-REFERENCE TO RELATED APPLICATION

This application is a continuation-in-part of application Ser. No. 08/937,532 entitled "Dual Use Reflective Article", filed Sep. 25, 1997, now abandoned.

BACKGROUND

The present invention relates generally to articles used in conspicuity applications such as highway signs, and has particular application to situations it) where an off-axis stationary light source is used to illuminate such a sign.

The use of retroreflective sheeting for signing applications is known. "Retroreflective" as used herein refers to the attribute of reflecting an incident light ray in a direction antiparallel to its incident direction, or nearly so, such that it returns to the light source or the immediate vicinity thereof. Known sheeting constructions use miniature glass beads in connection with reflective coatings, or alternatively cube corner arrays, to retroreflect incident light. They are designed to provide specified brightness values for a range of entrance angles. For design purposes, a typical angular separation of the driver of a vehicle and the vehicle's headlamps is taken to be less than two degrees; many sheeting constructions specify retroreflective brightness at a narrow 0.2 degree observation angle. The terms "observation angle" and "entrance angle" are defined along with other related terms at the end of the detailed description section.

FIG. 1A depicts a typical situation where a vehicle approaches a highway sign 2 positioned at the side of the road. A portion 4 of the light emitted from a headlamp impinges at an entrance angle β on retroreflective sheeting 6 disposed on the face of the sign 2. Sheeting 6 can be, for example, one of a variety of Scotchlite™ brand reflective sheetings available from 3M Company, such as "Engineer Grade" or "High Intensity Grade" sheeting. The sheeting 6 retroreflects the incident light in a narrow cone 8 which includes the driver's eye 10. The cone 8 has an angular half width 12, measured from the central maximum out to 10% of maximum brightness, of about 1.7 degrees for standard "Engineer Grade" sheeting and about 0.75 degrees for standard "High Intensity Grade" sheeting. As the vehicle advances along the direction 14 of the road, the entrance angle β increases and the cone remains centered on the vehicle headlamp. Because the retroreflected light is confined to a relatively narrow cone, the perceived brightness of the sign can be relatively high, depending upon the angular proximity of the observer's eye to the light source.

FIG. 1B depicts an alternative arrangement similar to that disclosed in PCT, Publication WO 96/04638. A sign 2 is illuminated by a stationary light source 16, which is positioned at an entrance angle of about 0 to 30 degrees relative to portions of the sign. Retroreflective sheeting 18 on the sign face reflects light in a wide cone, defined by an observation angle ranging from 0 to about 40 degrees. The cone of reflected light is wide enough to include an observer or driver 10 traveling along the roadway direction 14.

The present application discloses articles which can be used to advantage in arrangements like that of FIG. 1B, while maintaining desirable retroreflective properties as in FIG. 1A. As shown in FIG. 1C, light 4 from light source 16 is incident at an entrance angle β on a reflective article 20. The reflective article 20 redirects the light preferentially into two beams 22,24. The article 20 is designed such that one ol the beams 24 is directed towards and fills an observation zone 26. The light source 16, of conventional design, is located outside of the observation zone. Efficiency is enhanced by reducing wasted light, thereby increasing the amount of light available to illuminate the observation zone. The brightness of the observed bean 24 relative to the nonobserved beam 22 can be enhanced by using reflective elements in the article which have highly nonorthogonal reflecting surfaces in contrast to conventional cube corner elements.

BRIEF SUMMARY

The present application discloses a reflective article having a structured surface which includes a first and second array of reflective elements. The first array includes elements which have at least a first, second, and third reflecting face arranged to retroreflect incident light in a retroreflected beam. The second array includes elements which have at least a fourth, fifth, and sixth reflecting face arranged to reflect incident light in a second beam at an observation angle greater than 2 degrees. When the article is used in sheeting for signing applications, the second beam can be light originating from a stationary light source, the second beam illuminating an observation zone of interest, and the retroreflected beam can be light originating from a moving light source such as a vehicle headlamp.

BRIEF DESCRIPTION OF THE DRAWINGS

FIGS. 1A–B depict typical viewing and lighting scenarios for known retroreflective sheeting.

FIG. 1C depicts a viewing and lighting scenario for reflective articles disclosed herein.

FIG. 2 is a magnified plan view of a structured surface of a disclosed reflective article.

FIG. 3 is a further magnified representation of a side view of two reflecting surfaces in the structured surface.

Figure 4A:
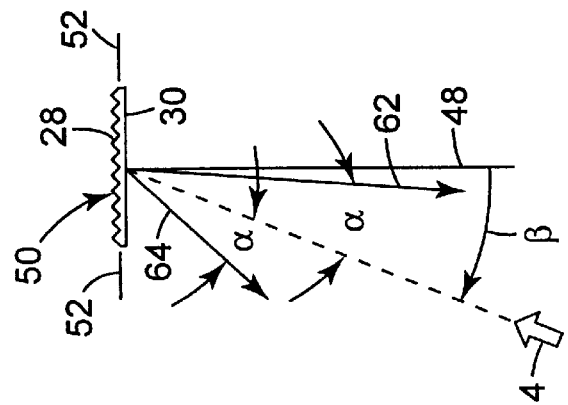
FIGS. 4A–C depict the reflective characteristics of an example reflector.

In the drawings, the same reference symbol is used for convenience to indicate elements which are the same or which perform the same or a similar function. Numerals enclosed in boxes represent brightness levels in units of cd/lx/m².

DETAILED DESCRIPTION OF THE ILLUSTRATIVE EMBODIMENTS

Example Reflector

FIG. 2 is a plan view of a rear structured surface 28 of an example reflective article that was fabricated and whose reflective properties were measured. The article has a front surface 30 (see FIGS. 4A–C) opposite the rear surface, through which incident and reflected light passes. Arrays of solid tetrahedral prisms 32,34 formed in the rear surface 28 reflect the incident light. Prisms 32,34 each have three mutually reflecting surfaces as shown at 36b,38b,40b and 36a,38a,40a respectively arranged about a base triangle. At least two reflecting surfaces of a given prism are arranged at a highly nonorthogonal dihedral angle to direct the reflected light preferentially into one of two beams for certain orientations of the incident light. Preferably, only two of the reflecting surfaces are so arranged, and the remaining reflecting surface pairs differ from orthogonality by a relatively small amount. Where the article is of unitary construction such that the base triangles do not correspond to a physical boundary between two layers, the tetrahedral prisms can also be considered to be trihedral prisms.

Prisms 32,34 are bounded by a plurality of parallel groove sets 36,38,40. The groove sets are preferably coplanar, and each groove set intersects the other two groove sets at an included angle of about 60 degrees to define equilateral base triangles for the prisms 32,34. If one wished to form a truncated cube corner with the dihedral angle between each pair of adjacent faces equal to 90 degrees, all of the grooves would have a groove full angle (the dihedral angle between two opposed prism faces, e.g. 36a,36b, that meet at a groove bottom) of about 70.5288 degrees. (Groove side angles would therefore be about 35.2644 degrees.) The example article instead used groove angles which radically departed from these orthogonal-producing angles: all of the grooves in groove set 36 used a full groove angle 10 degrees greater than the orthogonal-producing full groove angle (i.e., about 80.5288 degrees), and all of the grooves in groove sets 38,40 used a full groove angle 10 degrees less than the orthogonal-producing full groove angle (i.e., about 60.5288 degrees). The resulting tetrahedral prisms 32,34 had highly nonorthogonal reflecting surfaces—notably, surfaces 38b and 40b of prism 32 and surfaces 38a and 40a of prism 34—as seen from a comparison of dihedral angles between the example reflector and an ideal cube corner retroreflector in Table 1 below.

TABLE 1

| | PRISM DIHEDRAL ANGLES (IN DEGREES) | | |
|---|---|---|---|
| Prism Faces | Example Reflector | Cube Corner | Difference |
| 38a, 40a | 83.1662 | 90 | −6.8338 |
| 36a, 38a | 89.7824 | 90 | −0.2176 |
| 36a, 40a | 89.7824 | 90 | −0.2176 |
| 38b, 40b | 83.1662 | 90 | −6.8338 |
| 36b, 38b | 89.7824 | 90 | −0.2176 |
| 36b, 40b | 89.7824 | 90 | −0.2176 |

FIG. 3 is a representation (not to scale) of highly nonorthogonal reflecting surfaces 42,44 such as surfaces 38a,40a or surfaces 38b,40b, compared to orthogonal cube corner surfaces 42',44'. The dihedral angle 46 differs from 90 degrees by more than 2 degrees, and more preferably by at least about 4 degrees, and most preferably by about 6 to 8 degrees, so as to exhibit the beneficial asymmetric reflective properties disclosed herein.

The tetrahedral prisms 32,34 have 180 degree rotational symmetry about each groove set 36,38,40, thus forming "matched pairs" of prisms relative to each such groove set. A matched pair comprises one prism 32 and one prism 34. The rear surface is thus seen to comprise densely packed matched prism pairs. Prisms 32,34 also have mirror image symmetry about groove set 36. Groove set 36 is designated a "primary" groove set because the prisms have both rotational and mirror-image symmetry about it.

In addition to having the highly nonorthogonal reflecting surfaces, the example reflector used a very small groove spacing of 0.001 inches (25.4 μm) for each of the groove sets 36,38,40. This dimension is about 50 wavelengths of visible light at 555 nm, in about the middle of the visible spectrum and at the peak sensitivity of the human eye. No reflective coating was applied to the rear surface of the example reflector, as will be explained below, leaving the prism faces exposed to air so that total internal reflection (TIR) could occur at the prism faces. "Air" includes both atmospheric gasses at standard pressures as well as vacuum.

The prisms 32,34 are formed initially on a master mold by directly machining on a substrate the plurality of intersecting groove sets 36,38,40 using a diamond tool or other suitable procedure. The master mold substrate is preferably a unitary substrate made of copper or other suitable material that resists burring. A reflective article is then produced in the conventional manner: first a negative copy of the master mold is made, such negative copy referred to as a "stamper", and then a negative copy of the stamper is made in one surface, defined as the rear or structured surface, of a transparent sheeting. The reflective article thus has a rear surface which is a positive copy of the master mold. The reflective article of the example was a positive copy of the master mold in a 0.41 mm thick substrate of polycarbonate. Substrate thicknesses of less than about 1 mm are recommended for reflective sheeting where it is desirable to wind the sheeting on a roll for ease of storage and shipment. Such sheeting has an edge aligned in either a perpendicular or parallel fashion with one of the groove sets, preferably the primary groove set, for ease of installation. Polycarbonate has an index of refraction of about 1.6 over the visible portion of the spectrum, from about 400 to 700 nm. Polycarbonate has a relatively low dispersion, having an Abbe value of 34. Other transparent materials having various refractive indices and dispersion values in the wavelength range of interest can be used. For most applications flexible, durable materials having relatively low dispersion in the visible are preferred. Polymers are generally preferred for low cost an(d ease of manufacture. In one alternate embodiment the solid prisms can be composed of one material such as polycarbonate and the base triangles of the prisms can contact a thin base layer composed of a more flexible transparent material, the two-layer structure providing sheeting of enhanced flexibility. Such article can be made by cast and cure techniques such as those disclosed in U.S. Pat. No. 5,175,030 (Lu et al.) and U.S. Pat. No. 5,183,597 (Lu).

"Negative copy" as used herein refers to a copy of a given surface wherein the copy has inverted features complementary to features on the given surface such that the negative copy and the given surface can be brought into mating contact with each other; a "positive copy" of the given surface refers to an article produced from an even number of successive negative copies of the given surface. Both positive and negative copies also include enlarged or reduced articles that differ from the above description only by an isotropic scaling factor.

Optical Properties of Example Reflector

Figure 4B:
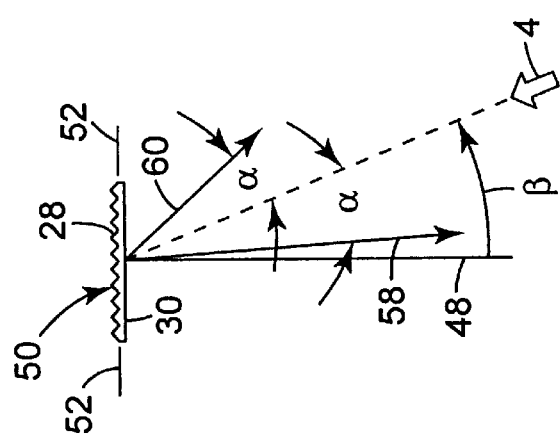
Figure 4C:
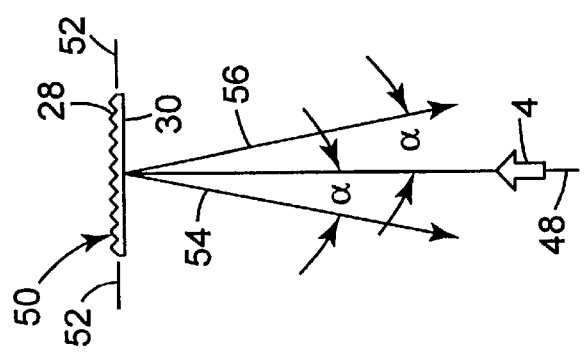

FIGS. 4A–C illustrate in simplified fashion the results of tests to measure the reflective properties of the example reflector. In the figures, a reference axis 48 is shown normal to the flat front surface 30 of the example reflector 50. The primary groove set 36 in the rear surface 28 is oriented along line 52. Arrow 4represents incident visible white light from a slide projector. The angle $\beta$ is the entrance angle of the incident light and cc is the observation angle of a given reflected beam. In FIG. 4A, light was incident at $\beta \approx 11.5$ degrees from below in a plane perpendicular to the plane of the drawing and containing reference axis 48. Two reflected beams 54,56 were observed at observation angles $\alpha$ of about 18 degrees on opposed sides of the incident beam. The measured brightness of the beams 54,56 were the same within 10%: beam 54 was $2.07E+4$ $cd/m^2$ and beam 56 was $1.87E+4$ $cd/m^2$. In FIG. 4B, light was incident at an entrance angle $\beta \approx 25.5$ degrees generally from the right of reference axis 48 as shown.

Two reflected beams 58,60 were again observed but surprisingly one of the beams was much brighter than the other. Beam 58, at $\alpha \approx 18$ degrees, had a measured brightness over 7 times that of beam 60, which was disposed at $\alpha \approx 21$ degrees. The measured brightnesses were $1.17E+4$ and $1.49E+3$ $cd/m^2$ respectively. In FIG. 4C, light was incident from the other side of reference axis 48 again at an entrance angle $\beta \approx 25.5$ degrees. Two reflected beams were again observed, and again one beam was over 7 times brighter than the other. Beam 62 in FIG. 4C, at $\alpha \approx 18$ degrees, had a measured brightness of $1.15E+4$ $cd/M^2$, and beam 64, disposed at ($\alpha \approx 21$ degrees, was measured at $1.46E+3$ $cd/m^2$. Note that reflected beams 54,56,58,60,62,64 are not retroreflected beams directed back to the source, nor are they "glare" resulting from simple specular reflection off the front surface of the article. Note also that in both FIGS. 4B and 4C, the brighter reflected beam is closer to the reference axis 48 (i.e., has a smaller angle of deviation therefrom) than each of the incident beam and the other reflected beam.

In summary, the example reflector was observed to split the incident light into two main reflected beams directed away from the source. Further, for certain oblique entrance angles, as may be encountered where a light source mounted on a roadside illuminates a sign positioned above the roadway, the reflector produced a higher brightness beam on one side of the light source than on the other side. Advantageously, the high brightness beam is directed toward the reference axis, where the roadway and expected observers would ordinarily be located.

Figure 5:
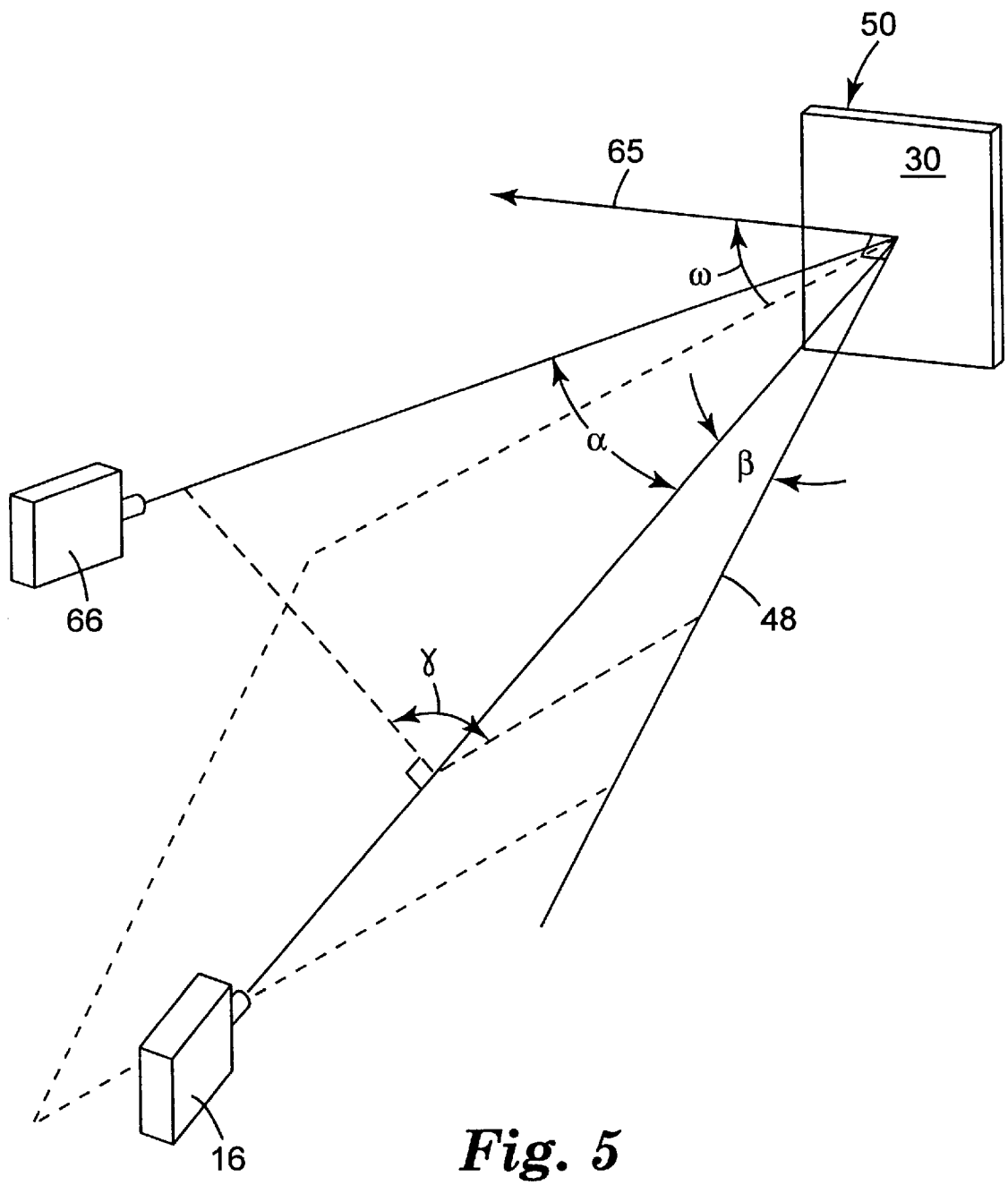
FIG. 5 shows an illumination and observation geometry for the example reflector.

The divergence profile of the same example article was measured at a different illumination geometry, shown in FIG. 5. The light source 16 was disposed at an entrance angle $\beta \approx 18$ degrees, and at an orientation angle $\omega \approx 18$ degrees relative to a datum mark 65 parallel to primary groove set 36. A visible light detector 66 scanned an area to map the reflected brightness as a function of observation angle cc and presentation angle $\gamma$.

Figure 6:
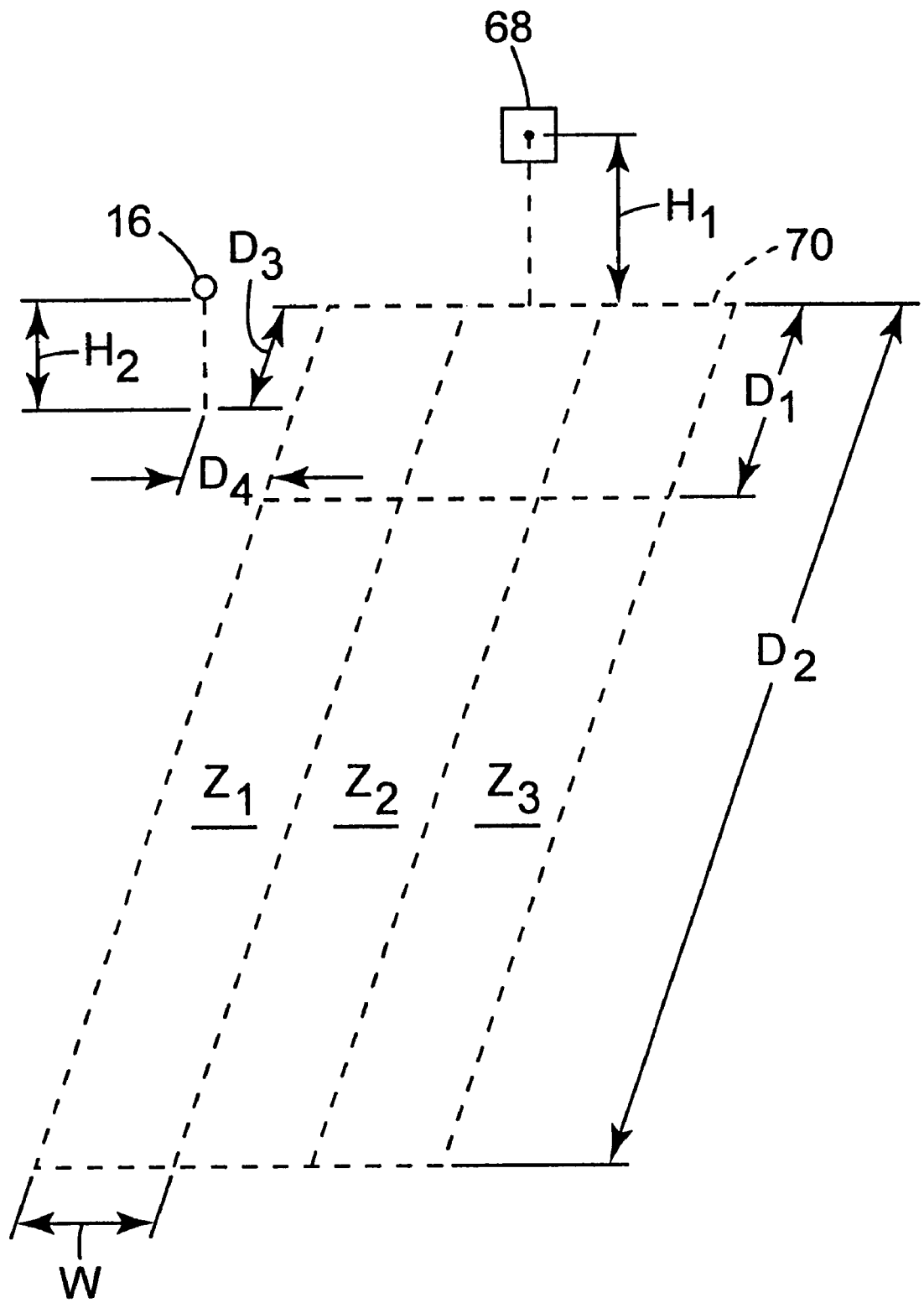
FIG. 6 shows a reflective article such as reflective sheeting mounted in position relative to a light source and an observation zone of interest.

The illumination geometry of FIG. 5 was used to simulate the sign placement layout shown in FIG. 6. In FIG. 6, a sign 68 is positioned at a height H1 above a reference plane 70 that corresponds to the roadway or to a plane above the roadway at the level of an average observer's eye. Three fixed observation zones Z1,Z2,Z3 located in reference plane 70 can correspond to lanes of traffic on the roadway, with observers moving along the lengths thereof. These zones have equal widths W and have front and rear boundaries at lengthwise distances D1,D2 from the projected sign position. Sign 68 is aligned with a lengthwise bisector of the middle zone Z2. Distances D3,D4, and height 112 above reference plane 70 specify the position of light source 16, which is located at the side of the road outside of the observation zones. Table 2 gives the design values in meters for the labeled distances in FIG. 6.

TABLE 2

| H1 | H2 | W | D1 | D2 | D3 | D4 |
|---|---|---|---|---|---|---|
| 5.9 | 3.8 | 3.6 | 50 | 200 | 20 | 0.75 |

Figure 7A:
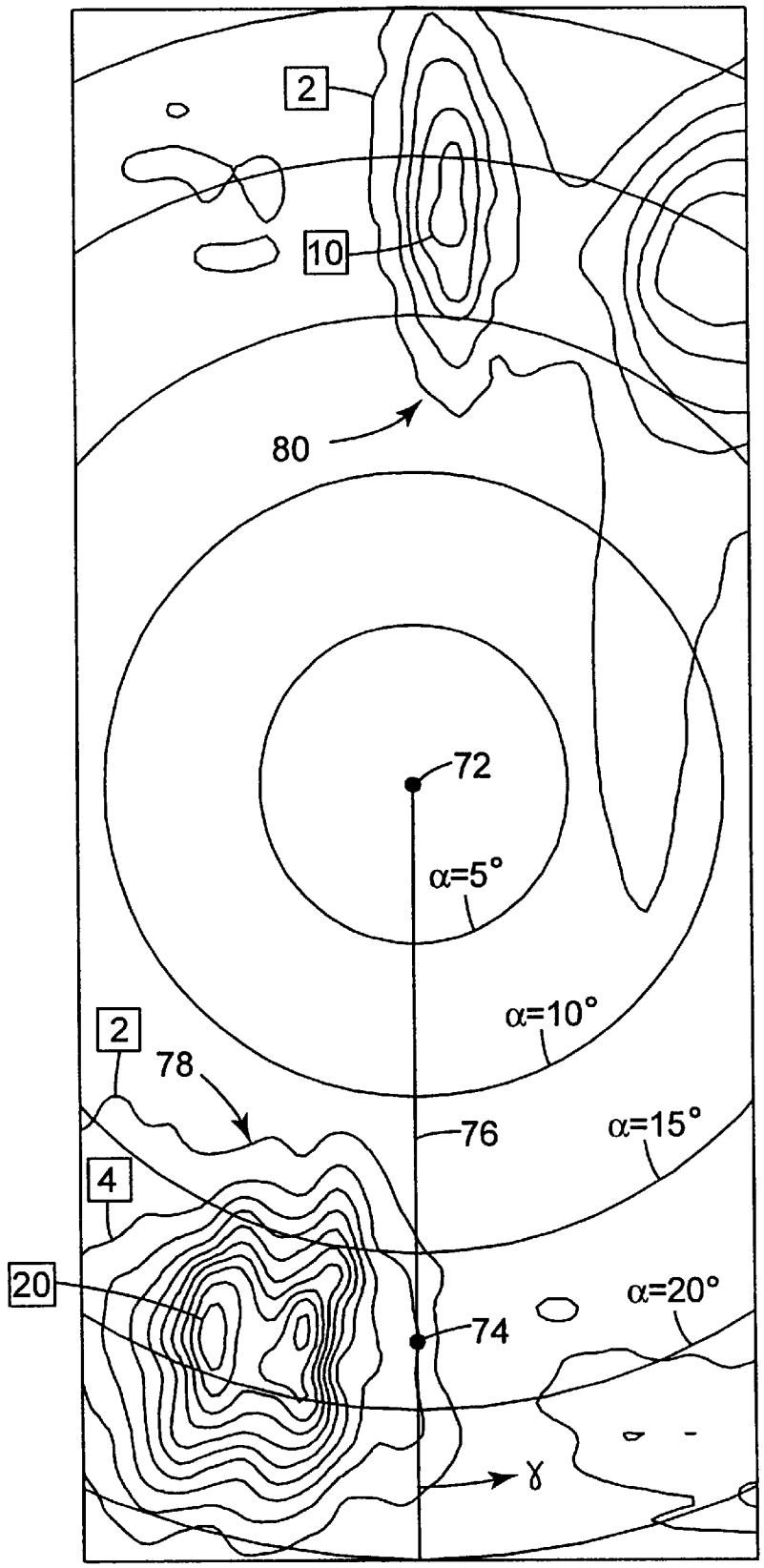
FIG. 7A is a plot of the measured divergence profile of the example reflector.

Plotting the data obtained from the detector of FIG. 5 yields the divergence profile shown in FIG. 7A, for the example reflector. Isobrightness contours are equally spaced in brightness value. A sufficient number of contours are labeled with brightness values in units of $cd/lx/m^2$ to enable the reader to ascertain the brightness value of any other contour. The brightness value labels are placed in boxes to distinguish them from ordinary reference numbers. The center point 72 of the plot corresponds to retroreflection directly back toward the source. Another point 74 corresponds to the reference axis 48. A line segment 76 passing through center 72 and point 74 serves as a reference from which presentation angle $\gamma$ is measured. The concentric circles centered about point 72 are for reference and show the observation angle ox.

Little or no significant light—i.e., no light above a selected background or reference intensity level, such as 0.5 $cd/lx/m^2$, the amount of diffuse reflectance from an ideal lambertian surface—is retroreflected back to the source. Instead, the example reflector produces two distinct beams 78,80 on opposed sides of the incident beam. The "lower" beam 78 seen in FIG. 7A overlaps and surrounds the reference axis 74. Lower beam 78 propagates to the right of light source 16 in the general direction of zones Z1–Z3 (see FIG. 6), while "upper" beam 80 propagates to the left of light source 16 away from observers in zones Z1–Z3. Consistent with the results depicted in FIGS. 4B–C, beam 78 has a peak brightness significantly higher than that of beam 80. With the present illumination geometry, however, the observed ratio was about 2, less than the previously observed ratio greater than 7. The measured peak brightnesses were 21.6 cd/lx/m² and about 10 cd/lx/m². In comparison, beaded sheeting currently available (part no. HV-8100 sold by 3M Company), which reflects incident light into a wide observation cone as in FIG. 1B, is specified at a brightness of about 0.5 cd/lx/m² at a 20 degree observation angle.

In addition to the brightness asymmetry between beams 78,80, there is a shape asymmetry of the beams insofar as beam 78 has a substantially different shape than beam 80. Beam 80 has two relative maxima both located at about equal observation angles but displaced in presentation angle to such an extent that two separate lobes, separated by a region having a brightness less than half that of either maxima, can be identified. Beam 78 also has two relative maxima located at about equal observation angles and displaced in presentation angle. However, the region between the relative maxima in beam 78 differs in brightness from that of either maxima by less than 20%, resulting in a more uniform beam profile compared to beam 80.

Figure 7B:
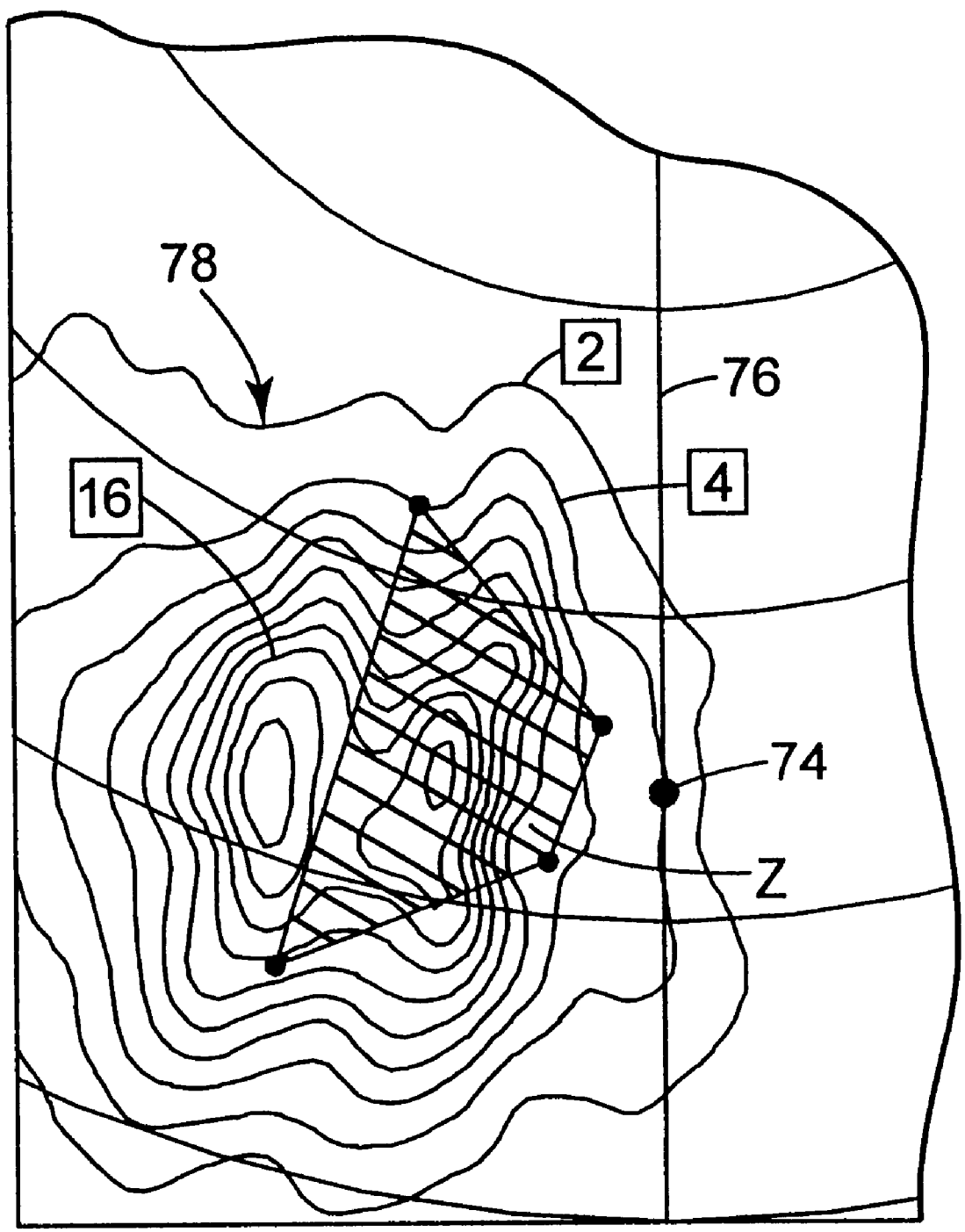
FIG. 7B is a magnified portion of FIG. 7A with a representation of an observation zone superimposed thereon.

FIG. 7B shows superimposed on an enlarged portion of FIG. 7A an observation zone outline Z. Outline Z is a representation in $\alpha, \gamma$ coordinates of the position of an automobile driver located anywhere within zones Z1, Z2, or Z3. As can be seen, the example reflector fills zone outline Z with a minimum brightness of 4 cd/lx/m², and up to 20 cd/lx/m² or more in some locations. The extent or "width" of beam 78 in observation angle, measured at a 4 cd/lx/m² brightness, is well within a factor of two times the extent in observation angle of zone outline Z. The "width" of beam 78 in presentation angle, similarly measured, is roughly two to three times that of zone outline Z. By this measure, the size of beam 78 is reasonably well matched to the observation zone. The effectiveness of the example reflector is enhanced by such matching of the beam 78 size to the observation zone, by the asymmetric brightness characteristic for oblique angles of incidence, and by the reflector's low or negligible retroreflectivity.

It is possible to shift the relative position of zone Z and beam 78 by making another reflector with a slightly modified structured surface, or instead by simply moving the light source 16 if feasible to a new position having a different entrance angle $\beta$ and/or orientation angle $\omega$. In this way illumination of zone Z can be optimized for maximum average brightness or for best uniformity by making minor adjustments to the placement of the light source. This will also permit the same sheeting to be used in two different applications where the size or position of the observation zones relative to the sign differ, for example overhead versus roadside mounting of a sign. To the extent light from the light source is incident across the face of the reflector over a range of $\beta, \omega$ values, it is desirable to have a reflected beam 78, for any given $\beta, \omega$ value within that range, somewhat larger than zone Z.

Computer Modeling of Alternative Embodiments

If it is desired to test alternative reflective element geometries different from the example reflector discussed above, one could manufacture new high precision molds with the desired geometries, fabricate reflective sheetings from the molds, and make direct measurements from the sheetings. A convenient lower cost alternative is to use a computer program or model to predict optical properties such as the divergence profile of a given desired geometry. This latter approach was used to test alternative reflector designs.

The computer model used took into account reflection, refraction, and diffractive effects. Reflections from the surfaces of the reflective elements took into account the differences between s- and p-polarized light. The model set up an array of individual rays all having a desired entrance angle and orientation angle uniformly across the base triangles of the various prism elements. The calculated output rays were processed to yield a divergence profile. Unless noted, a light wavelength in about the middle of the visible spectrum, ~555 nm, was used, and a refractive index of 1.6 was used.

Figure 8:
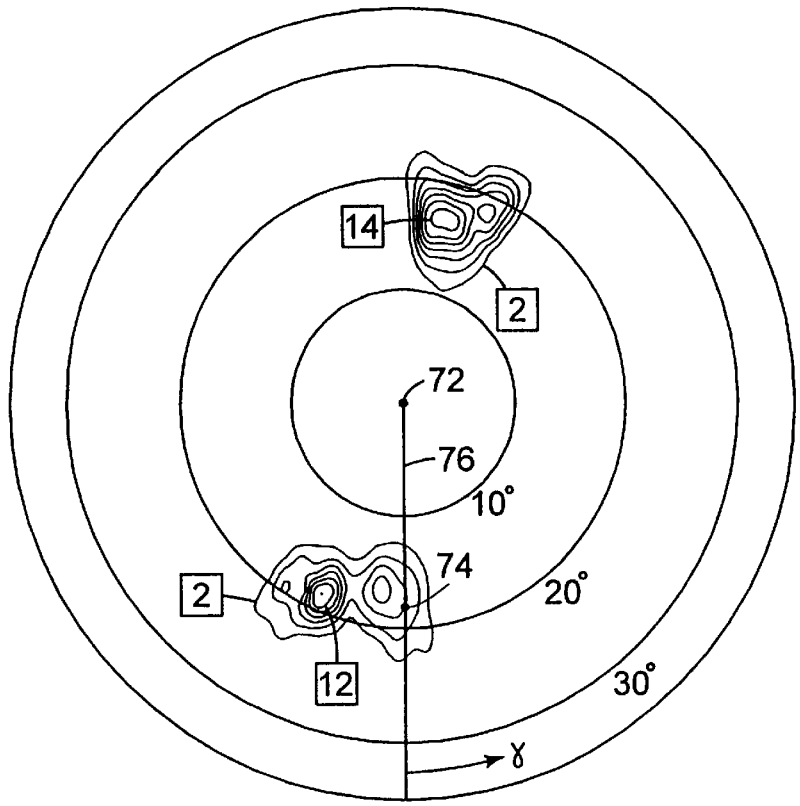
FIG. 8 is a plot of the predicted divergence profile of the example reflector.

FIG. 8 shows the calculated divergence profile for the geometry of the example article as described above and for the illumination geometry $\beta=18°$, $\omega=18°$. As in FIG. 7A, the center point 72 represents perfect retroreflection, point 74 represents the reference axis 48 normal to the reflector, and line segment 76 corresponds to $\gamma=0°$.

Comparison of the calculated divergence profile of FIG. 8 with the observed profile of FIG. 7A demonstrates that the computer model can be relied upon to draw general conclusions about the divergence profile of a given structured surface geometry. First, the overall two-beam pattern, with the beams located on opposed sides of the incident light direction, closely approximates the observed pattern. Second, the observation angle coordinates of the dominant maxima for each beam are close to the observed values, at $\alpha \approx 18°$. Third, the presentation angle coordinates of the beams generally agree with the observed beams, except for the elongated feature in the observed upper beam at $\alpha \approx 7°$, $\gamma \approx 90°$. Fourth, both figures show an asymmetry relative to point 72 in beam shape between the lower and upper beams. Although there are differences in detail between the calculated and observed beam shapes, the lower beams in both cases span an angle $\Delta \alpha$ of between 10 and 15 degrees and a presentation angle $\Delta \gamma$ of between about 40 and 50 degrees, measured at a 2 cd/lx/m² brightness level. This light level equals about 10% of the maximum brightness of beam 78 in FIG. 7A.

Some differences between the observed and calculated beams include details of the number or precise position of relative maxima within a beam. More significantly, the calculated divergence profile of FIG. 8 shows about equal maximum brightnesses of the two reflected beams in contrast to the factor of two observed in FIG. 7A.

With the capabilities and limitations of the computer model in mind, additional calculated divergence profiles will now be discussed for reflective elements that differ from those of the example reflector in order to demonstrate the effect of a change in the structured surface of the reflector. The illumination geometry is the same as that of FIG. 8 unless noted.

Figure 9:
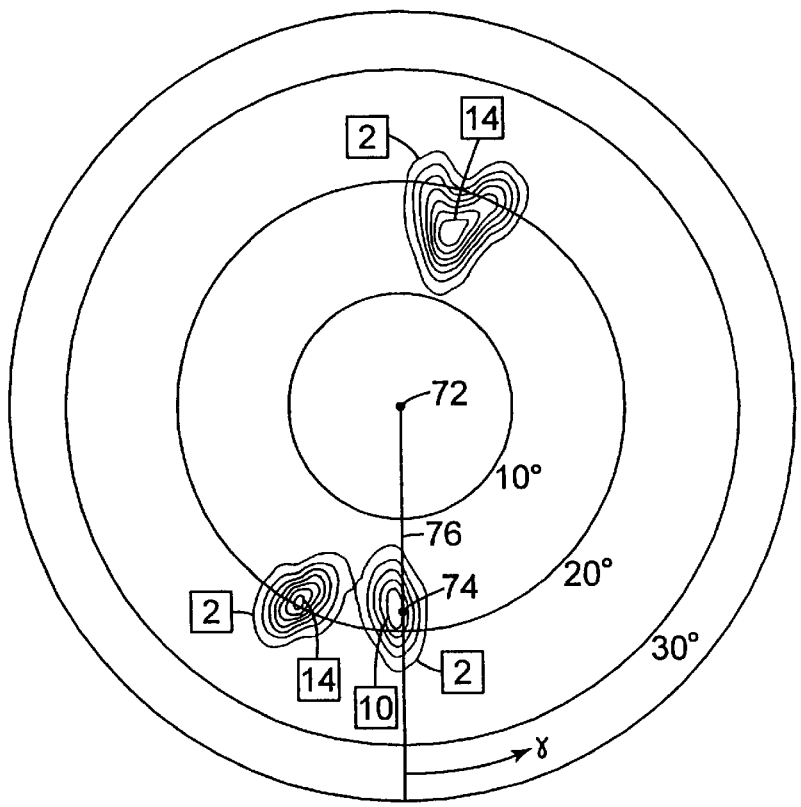
FIG. 9 is a plot of the predicted divergence profile of another reflective article.

Turning to FIG. 9, a divergence profile is shown there for an article like the example reflector except that full groove angles of about {81.47, 60.28, 60.28} degrees were used, resulting in dihedral angles between the tetrahedral prism faces of about {83, 90, 90} degrees. These values can be compared with the approximately {83.2, 89.8, 89.8} degree dihedral angles of the example. Comparing FIG. 9 with FIG. 8, the 0.2 degree change in dihedral angles is seen to produce an article which again redirects light into two general reflected beams, asymmetrically shaped with respect to each other, on opposed sides of the incident light direction. The beams of FIG. 9 have similar $\alpha, \gamma$ coordinates to those of FIG. 8. The lower beam of FIG. 9, however, is less spatially uniform than its counterpart in FIG. 8. The lower beam of FIG. 9 has a more pronounced 2-lobed beam shape, with one lobe being nearly centered on reference axis 74.

Figure 10A:
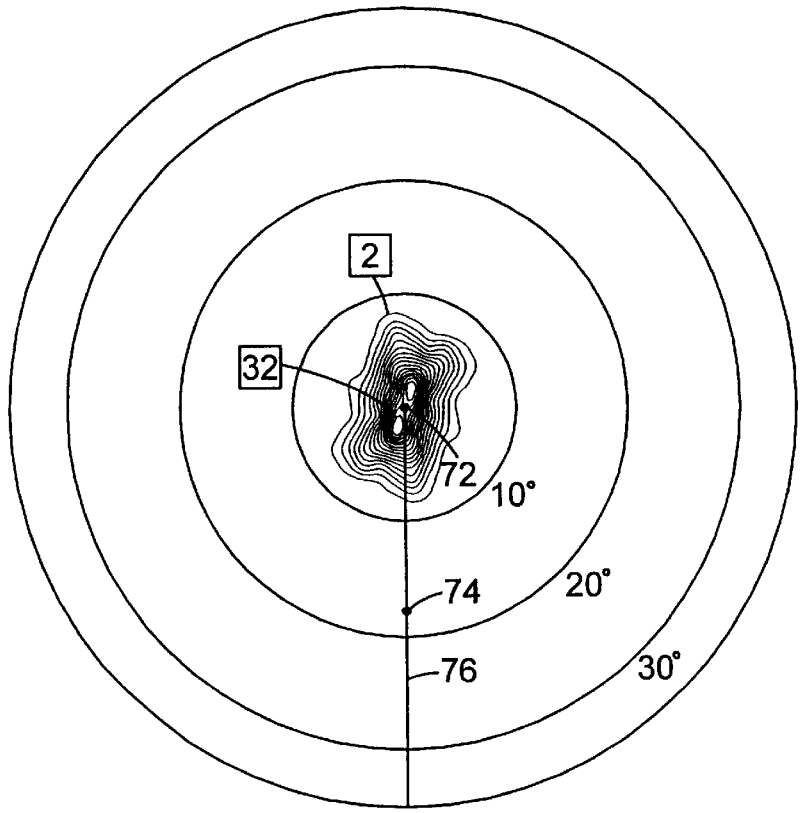
FIGS. 10A–J are a series of plots of the predicted divergence profile for certain reflective articles having reflective elements with one dihedral angle less than 90 degrees in one degree increments.
Figure 10B:
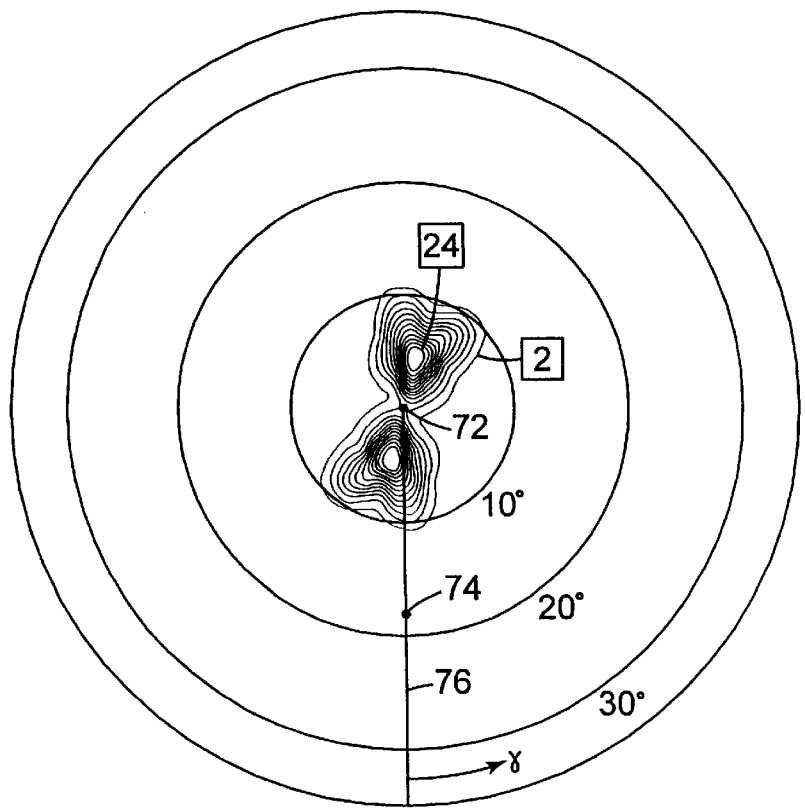
Figure 10C:
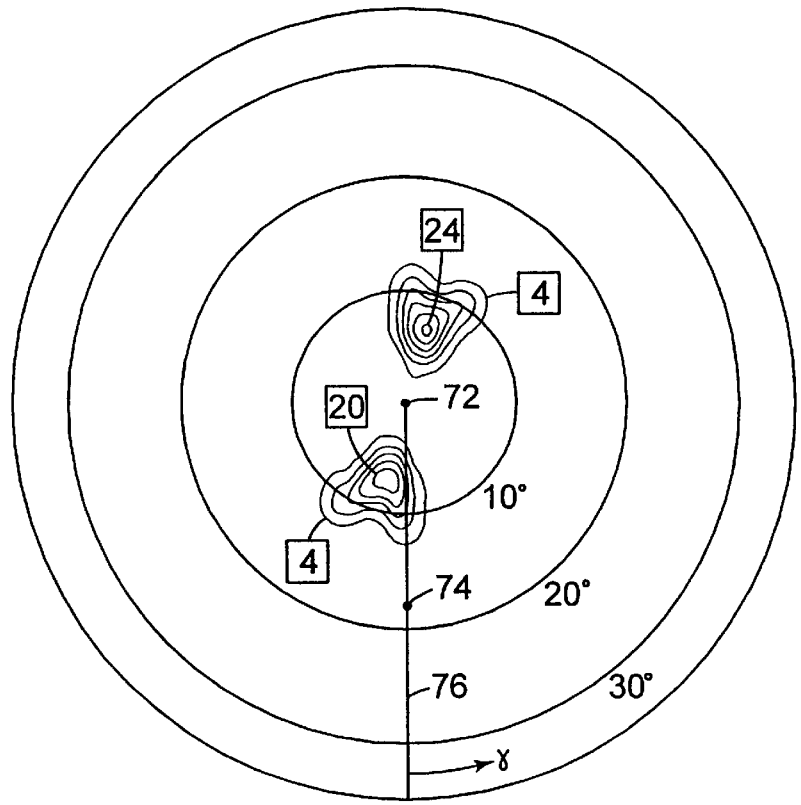
Figure 10D:
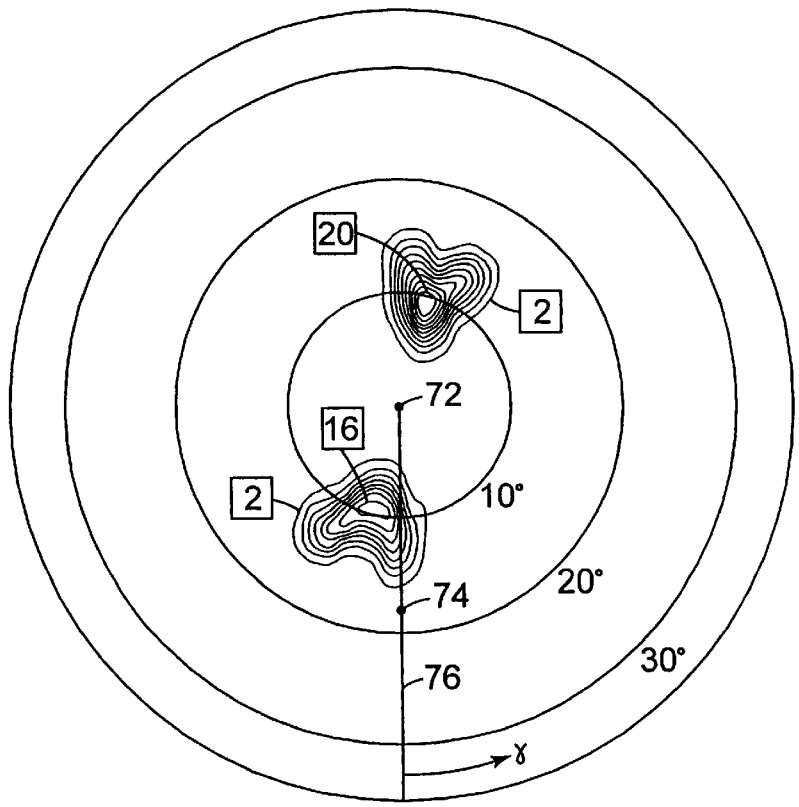
Figure 10E:
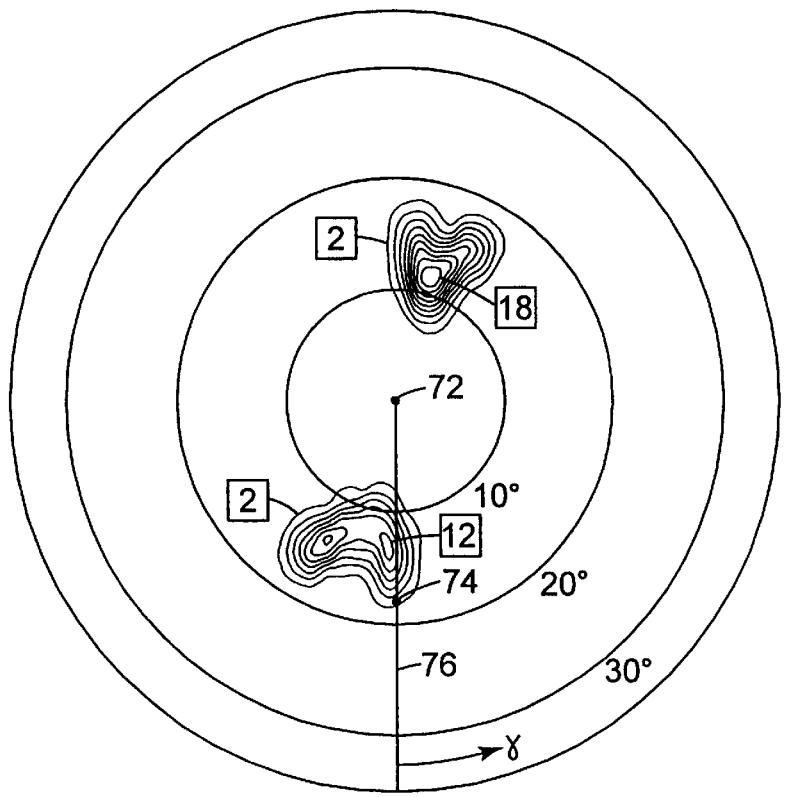
Figure 10F:
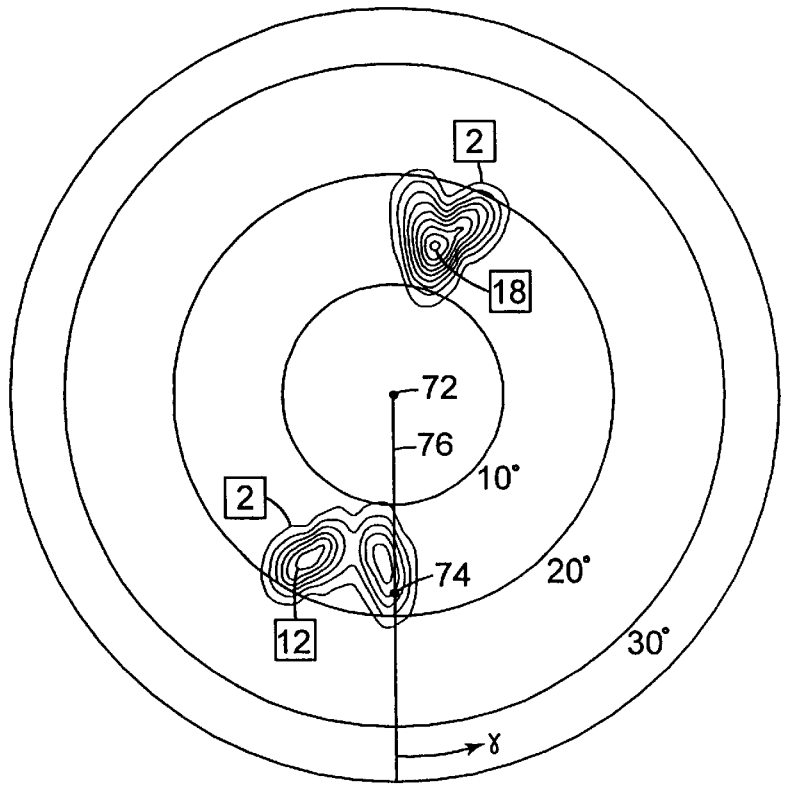
Figure 10G:
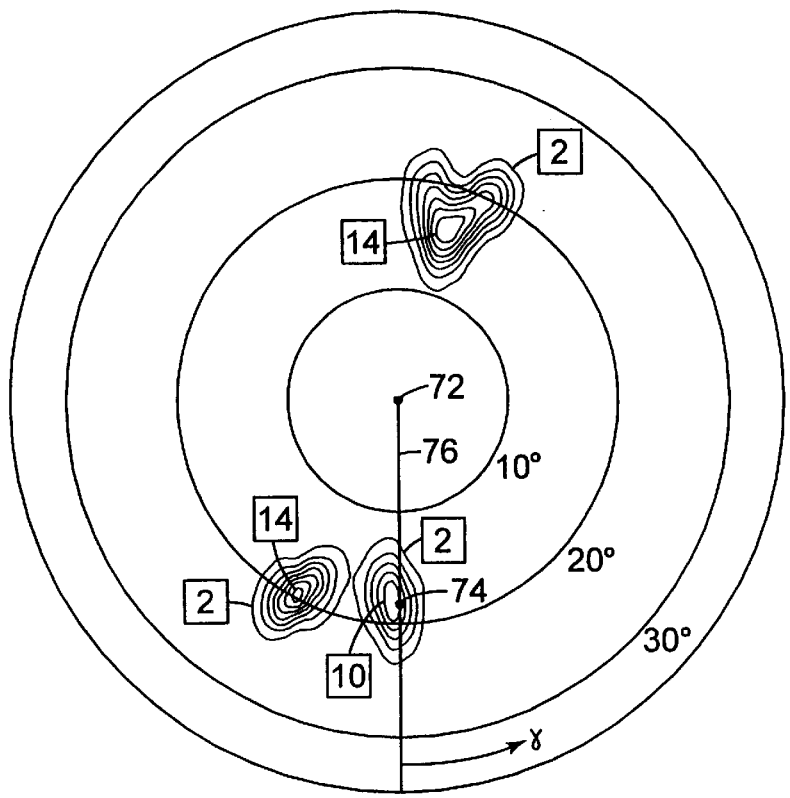
Figure 10H:
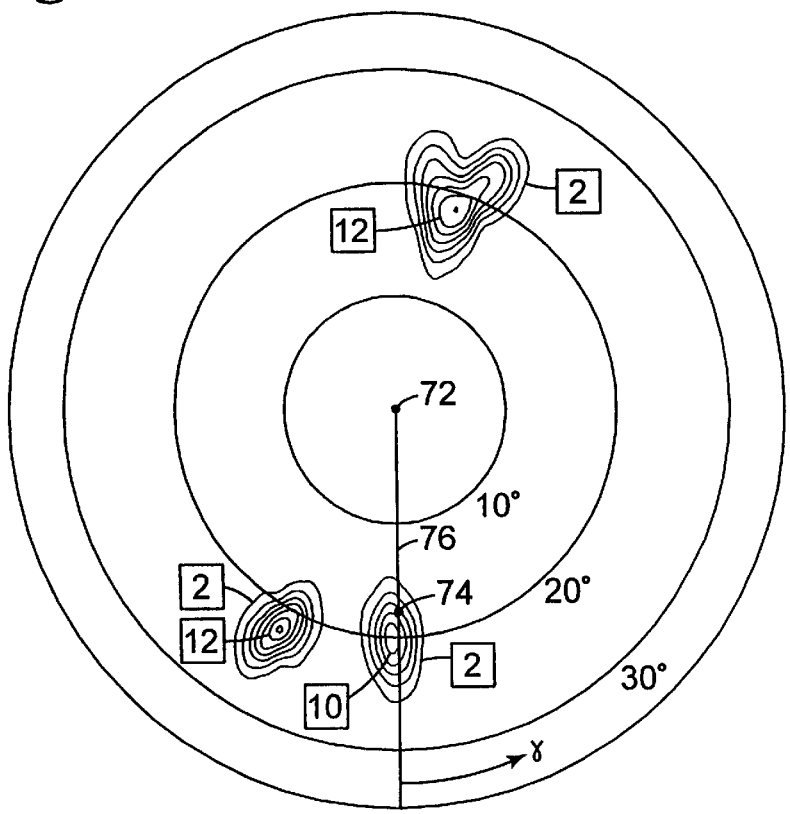
Figure 10I:
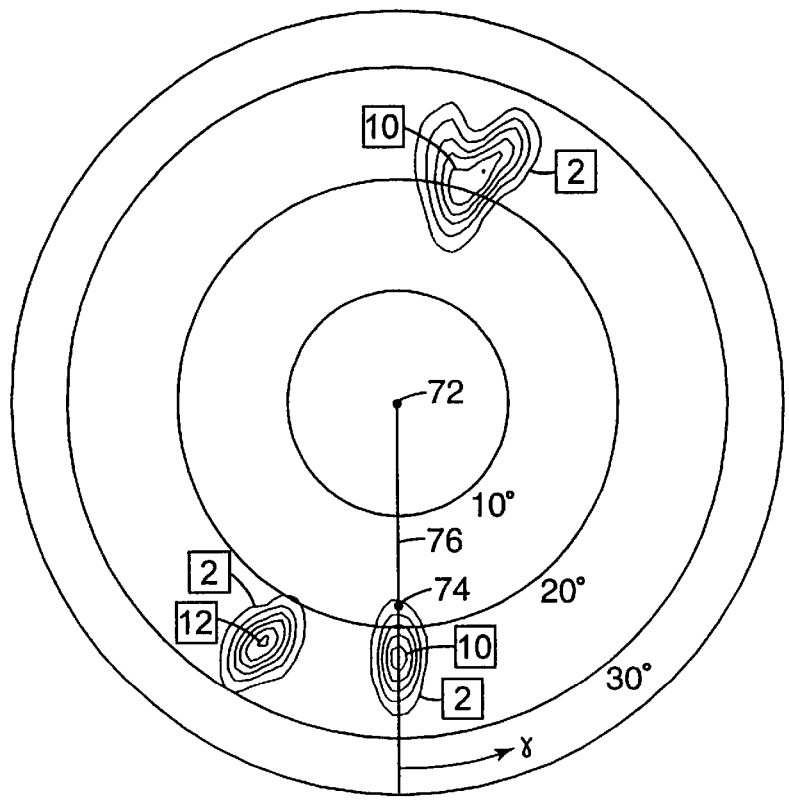
Figure 10J:
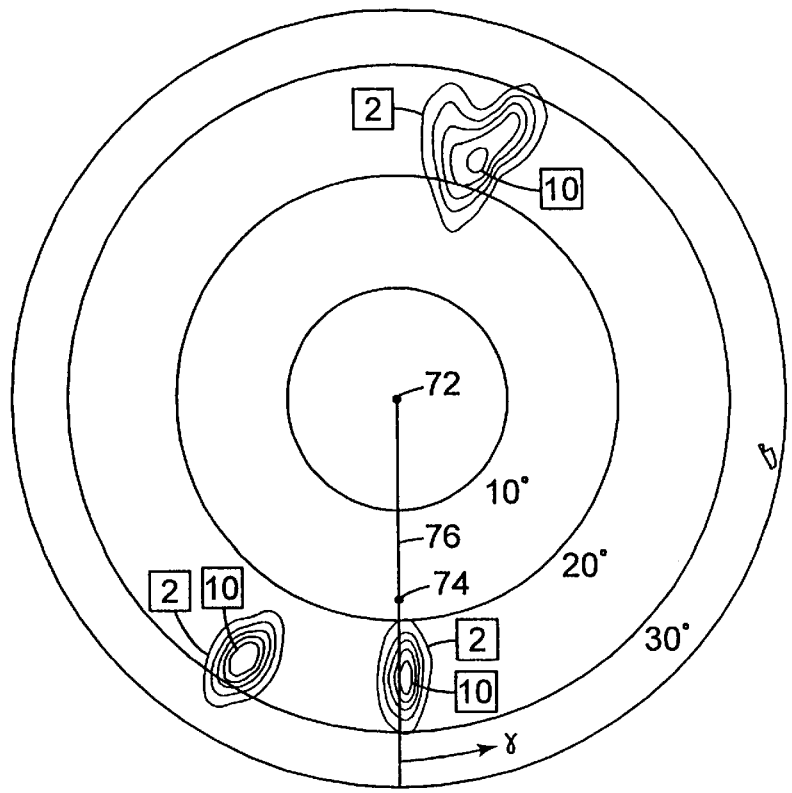

Turning now to FIGS. 10A–10J, the effect of decreasing dihedral angle deviation from 90 degrees is demonstrated in 1 degree increments. Groove angles are introduced such that FIG. 10A represents a structured surface with each tetrahedral prism having a single one degree deviation, i.e. dihedral angles of {89, 90, 90}, FIG. 10B represents a two degree deviation, i.e. dihedral angles of {88, 90, 90}, and so on. FIG. 10G is identical to FIG. 9. As shown, a deviation greater than about 2 to 3 degrees is required before any noticeable asymmetry is observed between the two reflected beams. Therefore the reflective articles of at least FIGS. 10D–J are herein referred to as having reflective elements with "highly nonorthogonal" reflecting surfaces. Note that for deviations of about 7 degrees or more the lower beam degenerates (at a level of 2 cd/lx/m$^2$) into two distinct lobes or daughter beams which, although not ideally suited for uniform illumination of a single large observation zone, may be useful for other applications.

Figure 11A:
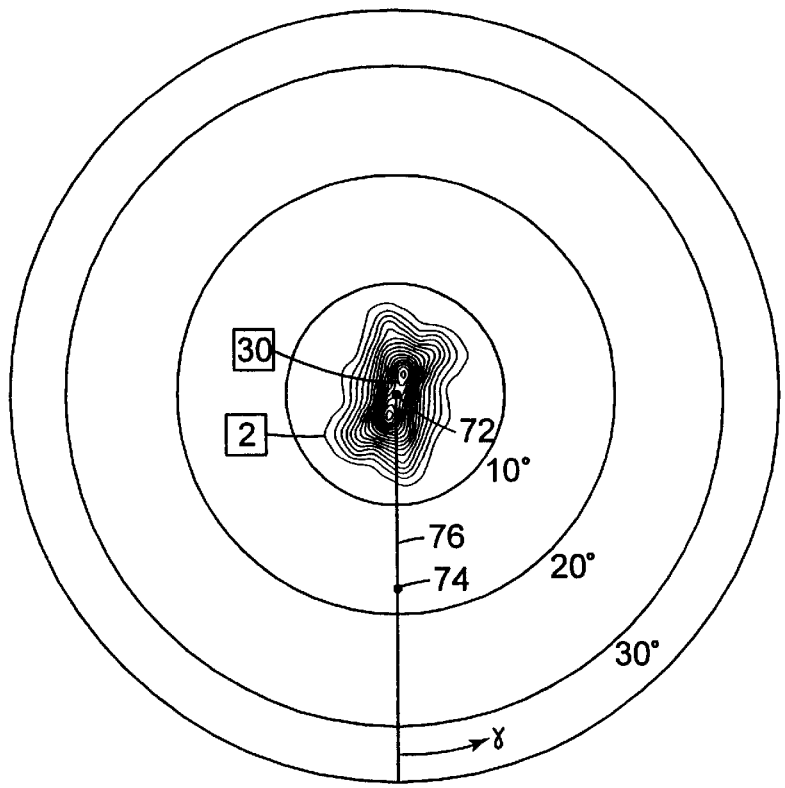
FIGS. 11A–J are a series of plots of the predicted divergence profile for certain reflective articles having reflective elements with one dihedral angle greater than 90 degrees in one degree increments.
Figure 11B:
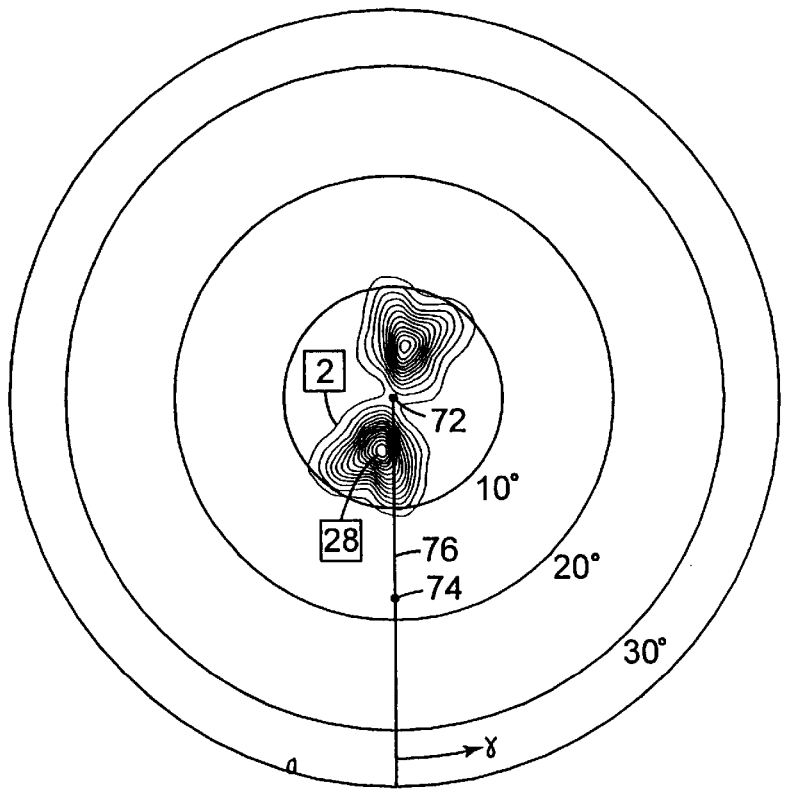
Figure 11C:
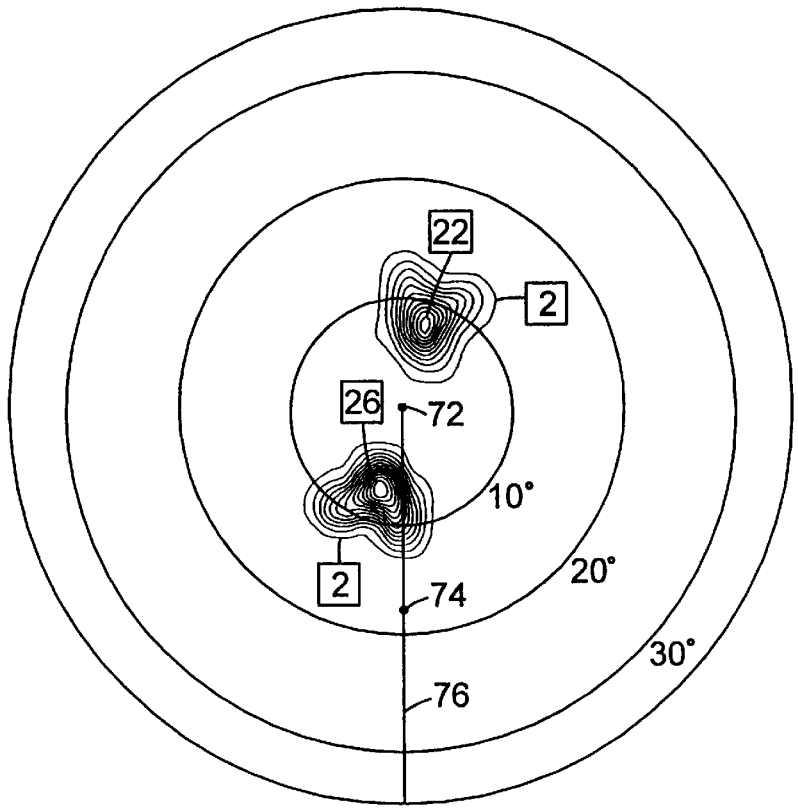
Figure 11D:
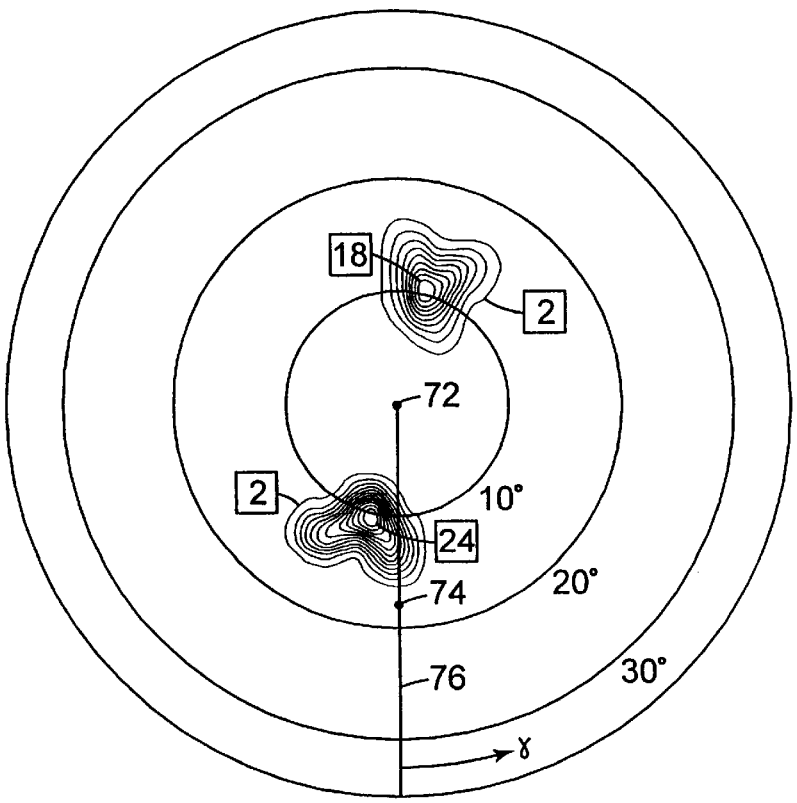
Figure 11E:
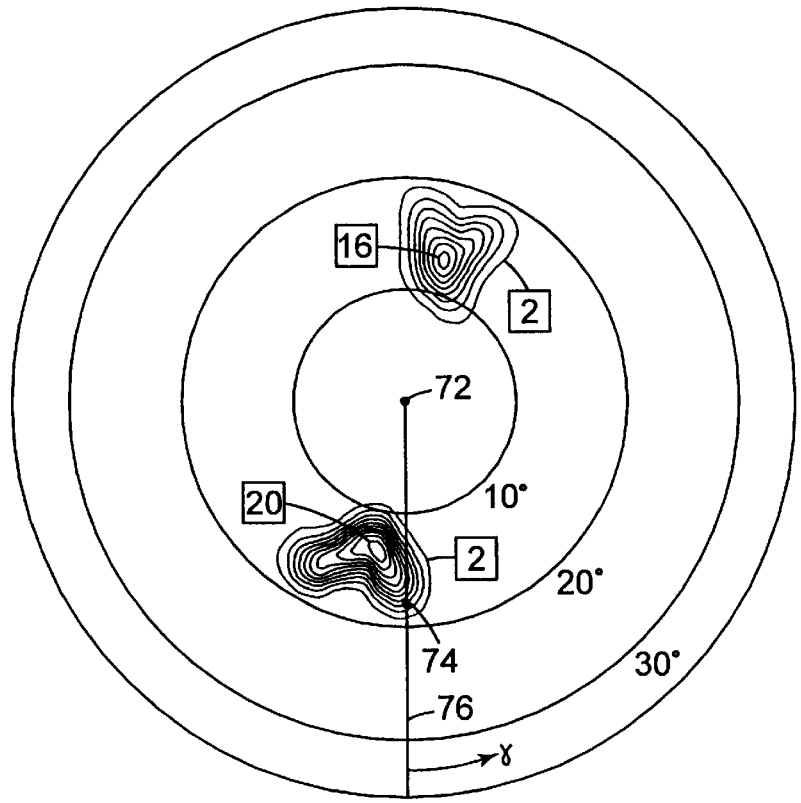
Figure 11F:
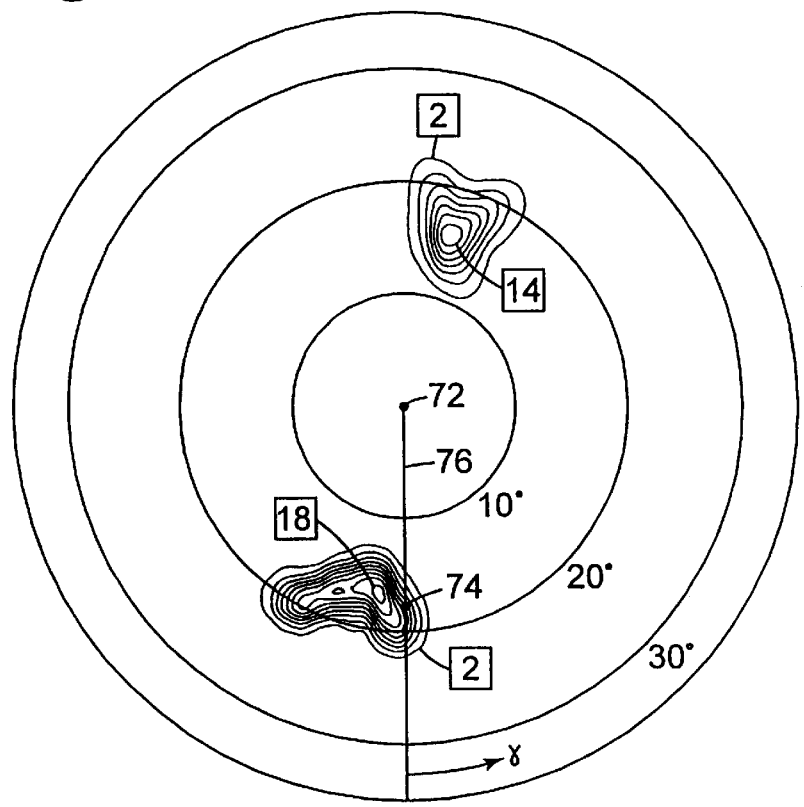
Figure 11G:
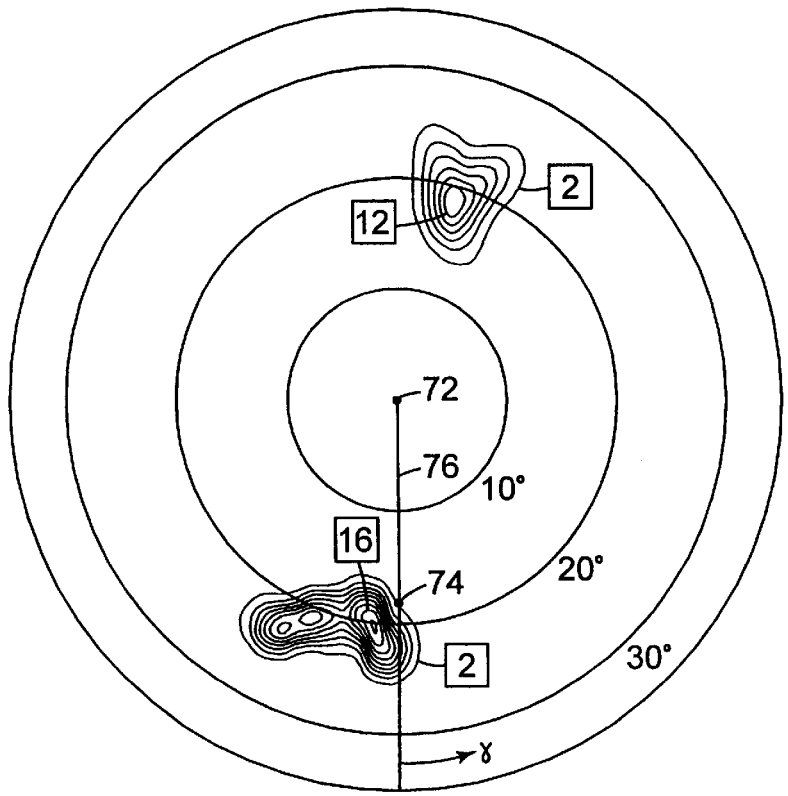
Figure 11H:
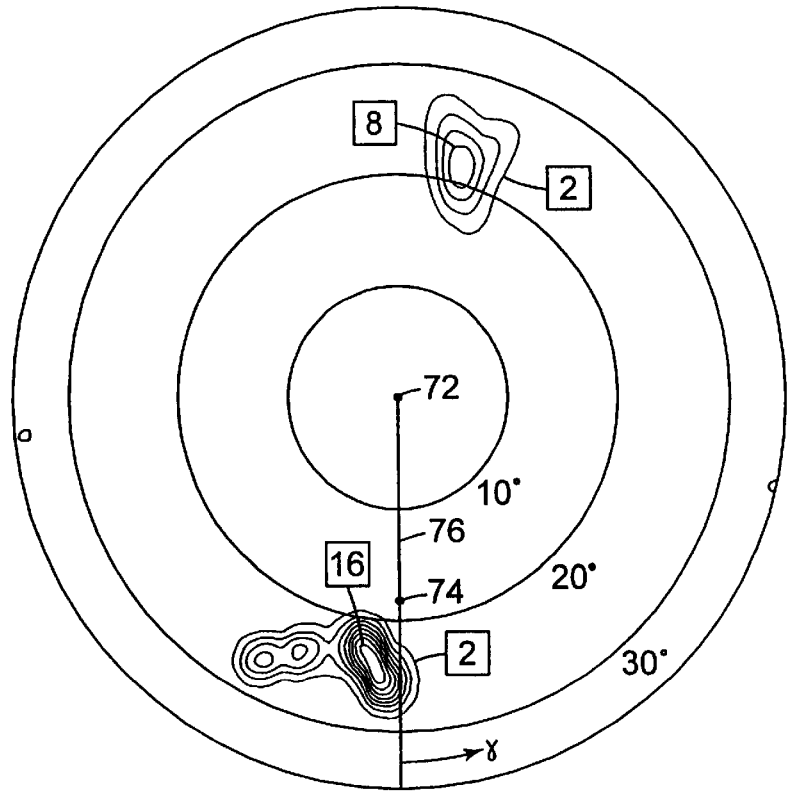
Figure 11I:
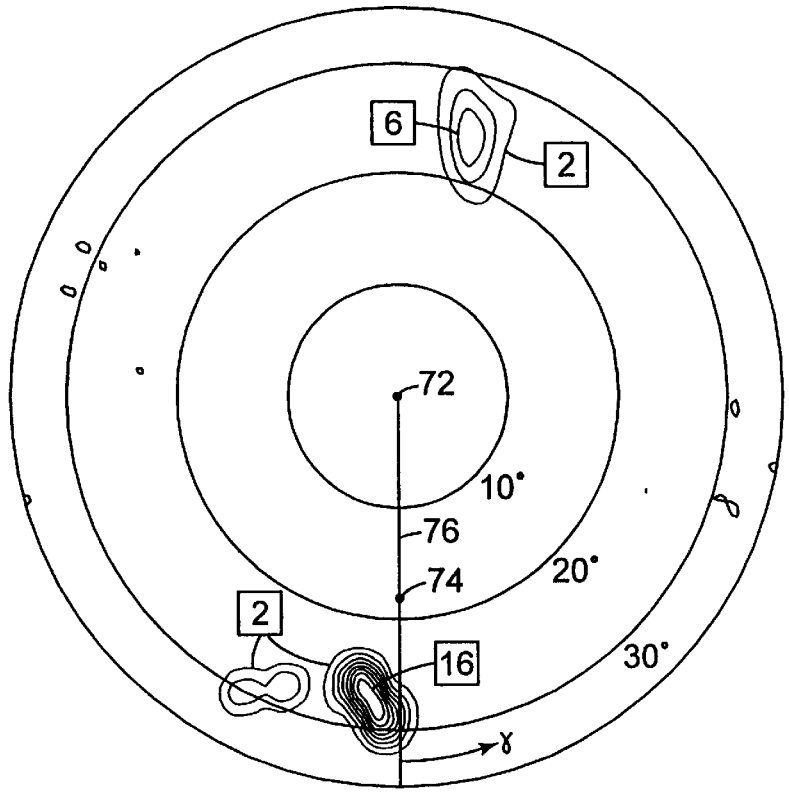
Figure 11J:
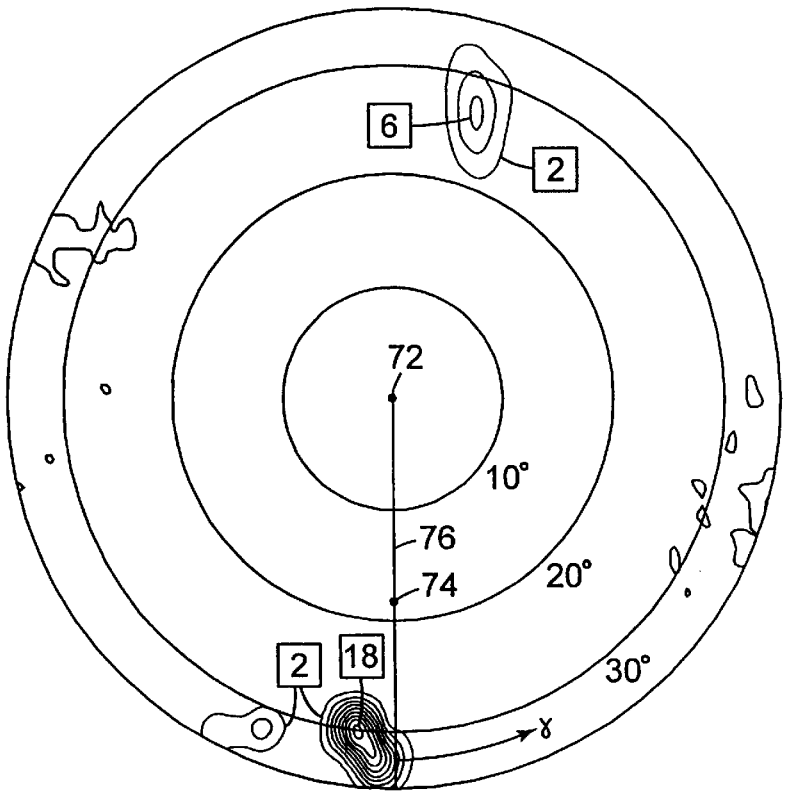

FIGS. 11A–J are similar to FIGS. 10A–J respectively except that the dihedral angle deviations from 90 degrees are of opposite polarity in 1 degree increments. FIG. 11A thus relates to prisms with dihedral angles of {91, 90, 90}, and FIG. 11J relates to prisms with dihedral angles of {100, 90, 90}. A deviation greater than about 2 to 3 degrees is again required before noticeable asymmetry is observed. Note that the lower reflected beam advantageously has a calculated brightness value greater than the upper beam. Similar to the behavior seen in FIGS. 10A–J, deviations beyond about 8 degrees yields separation of the lobes of the lower beam at a 2 cd/lx/m$^2$ light level.

Figure 12A:
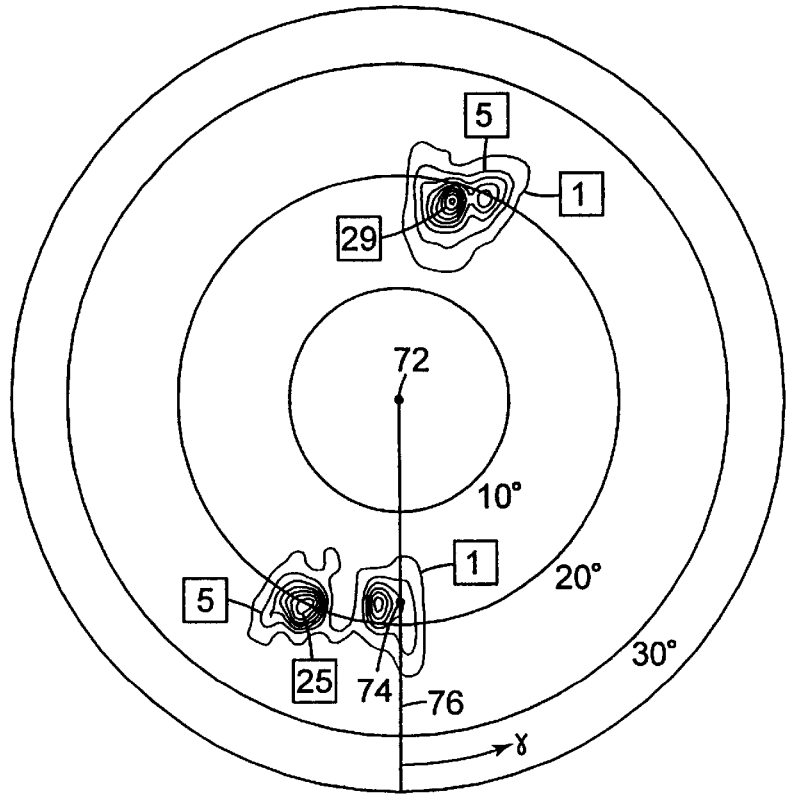
FIGS. 12A–B are plots of the predicted divergence profile for reflective articles having groove spacings different from the example reflector.
Figure 12B:
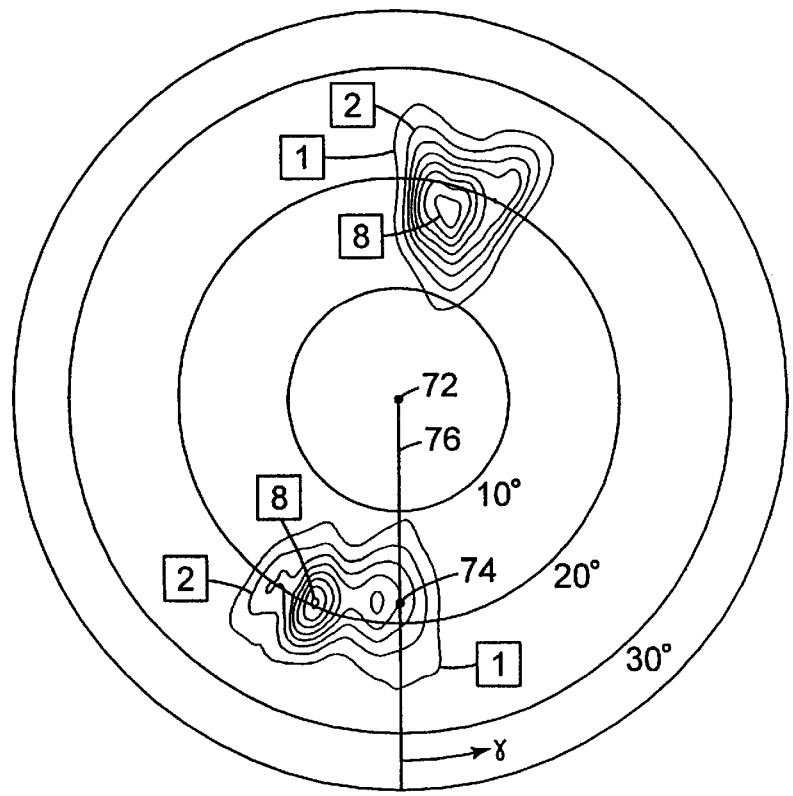

The angular extent or "width" $\Delta\alpha,\Delta\gamma$ of the reflected beam is a function of diffraction effects, which in turn are a function of the relative size of the individual reflective elements to the wavelength of light used. FIGS. 12A–B show predicted visible light divergence profiles for structured surfaces with groove spacings different from 0.001 inches. It was found that a change in groove spacing also affected the reflected beam direction. Therefore new full groove angles and corresponding dihedral angles were selected to at least partially compensate for this effect. In FIG. 12A the groove spacing of all three groove sets was increased to 0.0015 inches (38 $\mu$m). This spacing equates to about 75 wavelengths of visible light. The full groove angles were adjusted to {81.3621, 59.6955, 59.6955} degrees for the three groove sets respectively, yielding dihedral angles of {82.62, 89.745, 89.745} degrees. In FIG. 12B the groove spacing was decreased to 0.0007 inches (18 $\mu$m), or about 35 wavelengths of visible light. Dihedral angles are the same as in FIG. 12A. A narrower spacing is seen to yield a generally wider lower beam with less drastic brightness variations across the beam, which will be advantageous in some applications. A wider spacing yields a more concentrated and nonuniform lower beam which may not adequately illuminate observation zone Z but may work well in other applications. For roadway geometries similar to FIG. 6, a groove spacing in the range of 0.0004 to 0.002 inches (10 to 50 $\mu$m, or 20 to 100 wavelengths of visible light) is generally preferred.

Figure 13:
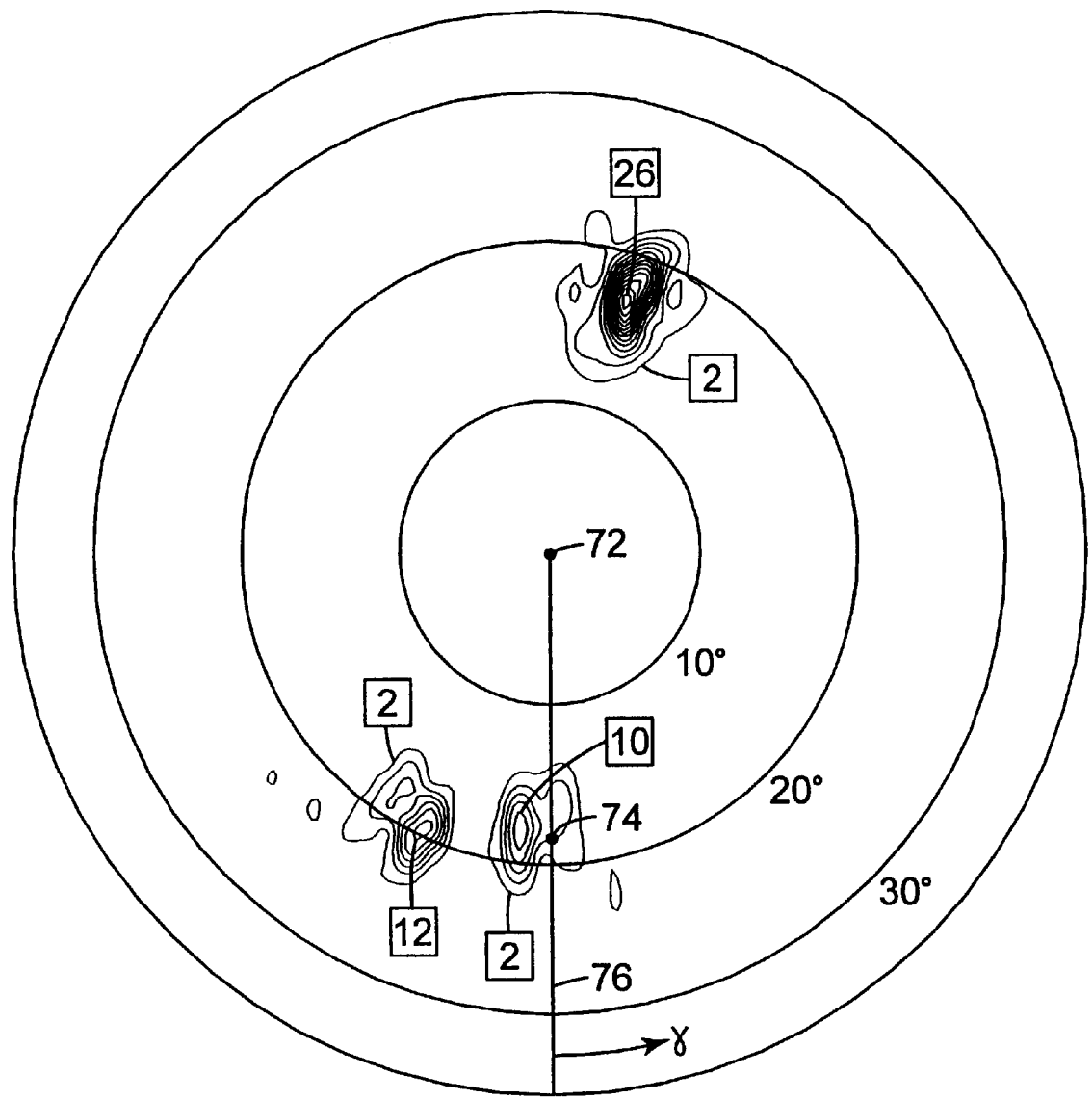
FIG. 13 is a plot ol the predicted divergence profile for a reflective article similar to the example reflector except that the structured surface has a coating thereon with 90% reflectivity.

It is known to coat the structured surface side of prismatic sheeting with a thin reflective layer of metal. In the case of sheeting having elements with highly nonorthogonal reflecting surfaces, the effect of such reflective coatings in contact with the reflecting surfaces is a decreased overall brightness of the reflected beams and a reduced width of at least the lower beam. FIG. 13 shows the predicted divergence profile for the reflector of FIG. 8 except that a 90% reflectivity coating has been added to each of the three mutually reflecting prismatic surfaces. Comparison of the figures shows the advantage, if high brightness and spatial uniformity is desired, of keeping the reflecting surfaces uncoated and instead relying on TIR from the reflecting surfaces.

It is contemplated that groove sets that intersect each other at angles other than 60 degrees can also be used in order to form reflective elements which are canted. The grooves can be arranged to define base triangles that have exactly one included angle greater than 60 degrees, or instead that have exactly one included angle less than 60 degrees. The base triangles of the reflective elements can be isosceles or scalene. The groove side angles are selected to form tetrahedral prisms having at least two highly nonorthogonal reflecting surfaces, as described above. Alternately, reflective elements which are not defined by parallel groove sets, referred to in the art as full cube corner elements, whether canted or uncanted, can also be used.

A reflective article such as sheeting made in accordance with the principles disclosed herein can use conventional backing materials for sealing the prismatic elements in air, as well as adhesive layers and release sheets. See, for example, U.S. Pat. No. 4,938,563 (Nelson et al.), incorporated herein by reference. A conventional top film covering the smooth front surface 30 of the reflective layer can also be used for absorbing ultraviolet light which may damage the reflective layer. Dyes can be added or mixed with the reflective layer material to impart a colored appearance to the article.

Tiling; Dual Use Sheeting

Spatial uniformity of the beam reflected from the stationary light source towards the observation zone can be enhanced or otherwise modified by incorporating more than one type of reflective element matched pair in the structured surface of the reflective article. By tiling or otherwise incorporating different reflective element arrays on the same article, using known manufacturing methods, a sheeting can be produced having a divergence profile which is the average (or other weighted combination, according to the relative surface areas used) of the divergence profiles of the individual reflective element designs used.

Figure 14:
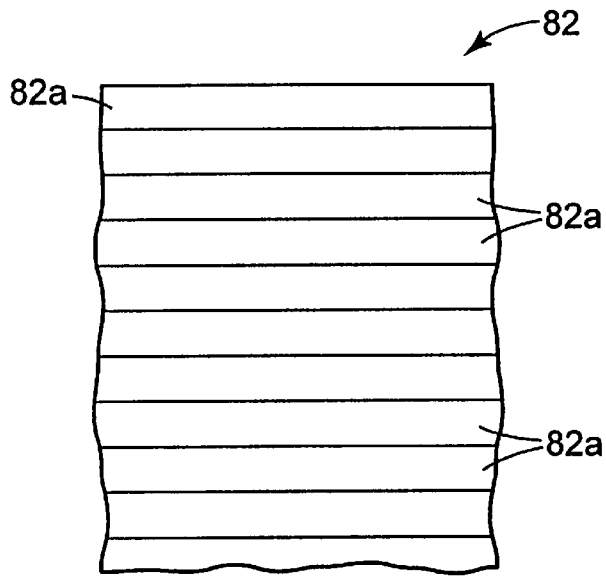
FIG. 14 is a plan view of a reflective article having at least two different arrays of reflective elements.

FIG. 14 represents a sheeting 82 comprising adjacent striped areas 82a. Each area 82a is filled with an array of one kind of element, whether reflective or retroreflective. Areas 82a preferably have a width less than about 50 mm so that the individual areas are imperceptible from viewing distances of about 30 m or more, giving the sheeting a uniform appearance. Patterns other than stripes, such as rectangles, squares, and other geometric shapes, can also be used.

Figure 15:
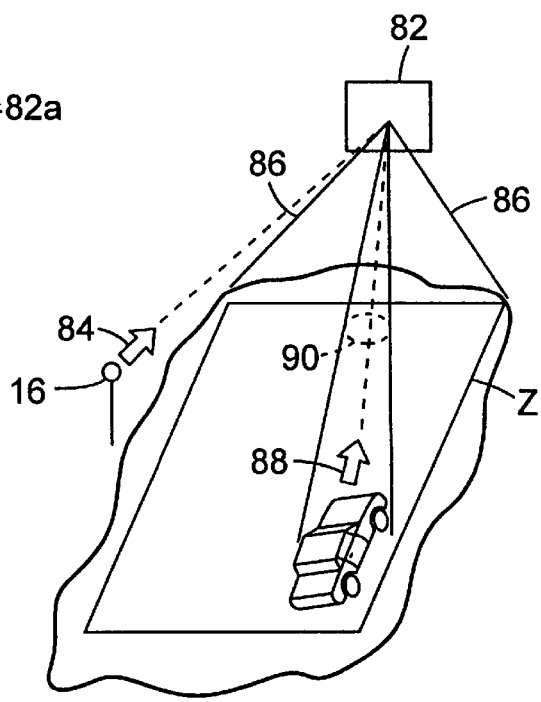
FIG. 15 shows a dual use reflective article mounted in position relative to a light source and an observation zone.

A unique advantage is achieved by including areas of retroreflective elements in sheeting 82 as well as areas of elements such as those disclosed above that are reflective but not retroreflective. Such sheeting 82, shown in FIG. 15, has dual utility. First, sheeting 82 directs light 84 from stationary light source 16 into a wide beam 86 that fills the observation zone Z. Second, sheeting 82 retroreflects light 88 from a source on a moving vehicle into a narrower beam 90 centered on the moving source. The sheeting 82 can thus be installed both in locations where a fixed light source will be illuminating the sign at an appropriate angle and in locations where no such light source is available. Even in those locations where such a source is provided, the retroreflective areas insure that the sign will remain visible to vehicle drivers if the stationary source fails to operate.

Since retroreflected beam 90 remains centered on the moving light source of the vehicle, such beam 90 will have high visibility to vehicle drivers even outside of zone Z where the observation angle of the driver's eye relative to the vehicle headlamp is very small. The retroreflected beam 90 is produced by conventional cube corner retroreflective elements such as those disclosed in U.S. Pat. No. 4,588,258 (Hoopman), U.S. Pat. No. 4,775,219 (Appledorn et al.) or U.S. Pat. No. 5,138,488 (Szczech), and is generally confined to about a two degree observation angle relative to the direction of incident light 88. Beam 86 in contrast is generally directed at observation angles beyond two degrees. Beam 86 is preferably produced by reflective elements having highly nonorthogonal reflecting surfaces as described above, although elements that produce symmetrical reflected beams may also be useable in some circumstances.

Table 3 shows one possible design for the article 82 of FIG. 14. The design repeats every 7 stripes. The structured surfaces of areas 82a are defined in terms of the deviation in each pair of groove side angles from the orthogonally-producing groove side angle of 35.2644 degrees (groove sets intersect at 60 degree included angles). One-seventh of the area is occupied by retroreflective elements, and the remainder is occupied by three different reflective element designs in order to produce a reflected beam 86 of improved uniformity and greater width. Such tiling increases the width of the reflected beam 86 where each reflective element array alone cannot fill the observation zone with an adequate amount of reflected light.

TABLE 3

| | GROOVE SIDE ANGLE DEVIATION (IN MINUTES OF ARC) | | |
|---|---|---|---|
| No. of Stripes | Groove set 36 | Groove set 38 | Groove set 40 |
| 1 | 0 | 0 | 0 |
| 2 | +200 | −200 | −200 |
| 2 | +350 | −350 | −350 |
| 2 | +400 | −400 | −400 |

Table 4 shows an alternative simpler design that repeats every two stripes. The design comprises alternating areas of reflective elements associated with FIG. 11G, having {97, 90, 90} degree dihedral angles, and conventional cube corner retroreflective elements.

TABLE 4

| | GROOVE SIDE ANGLE DEVIATION (IN MINUTES OF ARC) | | |
|---|---|---|---|
| No. of Stripes | Groove set 36 | Groove set 38 | Groove set 40 |
| 1 | 0 | 0 | 0 |
| 1 | −273 | +289 | +289 |

The structured surface of article 84 can have individual reflecting and/or retroreflecting elements of different sizes. For example, reflective elements in a first area 82a can have a first groove spacing and reflective elements in a second area 82a adjacent the first area can have a different groove spacing so that the elements have different sizes. Likewise retroreflective elements can be larger or smaller than the reflective elements.

Figure 16:
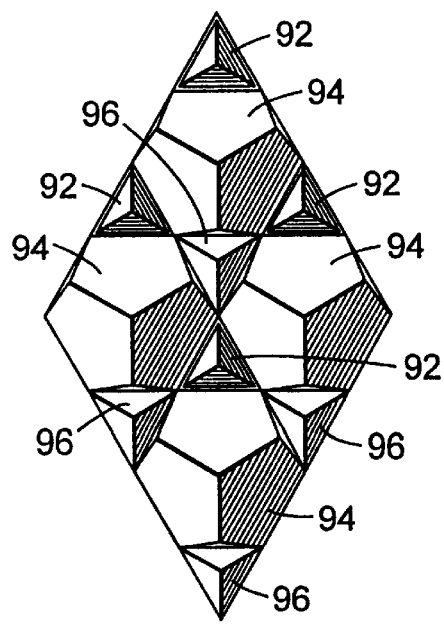
FIG. 16 shows a magnified plan view of a PRIOR ART structured surface which can be made to incorporate both reflective and retroreflective elements.

The arrays of various reflecting and/or retroreflecting elements can also be interspersed with one another by modifying the PRIOR ART configuration shown in FIG. 16 (see U.S. Pat. No. 5,600,484). The magnified plan view shown there depicts three arrays of different elements 92,94, 96. Elements 94,96 have the same set of dihedral angles since their reflecting surfaces are coplanar with each other. Reflecting surfaces of elements 92 however are formed independently of elements 94,96. Advantageously, groove angles can be selected such that elements 94,96 are retroreflective elements, having orthogonal dihedral angles, and elements 92 are reflective elements, having at least one nonorthogonal dihedral angle, or vice versa. However, this arrangement has less flexibility in choosing the ratio of areas covered by the respective arrays compared with the embodiment of FIG. 14. It also has less flexibility in choosing relative sizes of individual elements.

Additional Embodiment

In an effort to produce a reflected beam having a wider angular extent and improved spatial uniformity, without having to tile a large number of different reflective element structured surfaces, a structured surface was designed which incorporated a variety of different reflective element types interspersed with each other on the structured surface in a repeating pattern. The various reflective element types each have at least one dihedral angle which differs by more than about 2 degrees from a right angle. The elements are defined by a repeating sequence of different (large) deviations in groove side angles relative to groove side angles that would produce 90 degree dihedral angles. For elements having equilateral base triangles, groove side angle deviations are measured relative to a nominal groove side angle of about 35.2644 degrees. For canted elements, groove side angle deviations are measured relative to the groove side angle that would produce a 90 degree dihedral angle.

Figure 17:
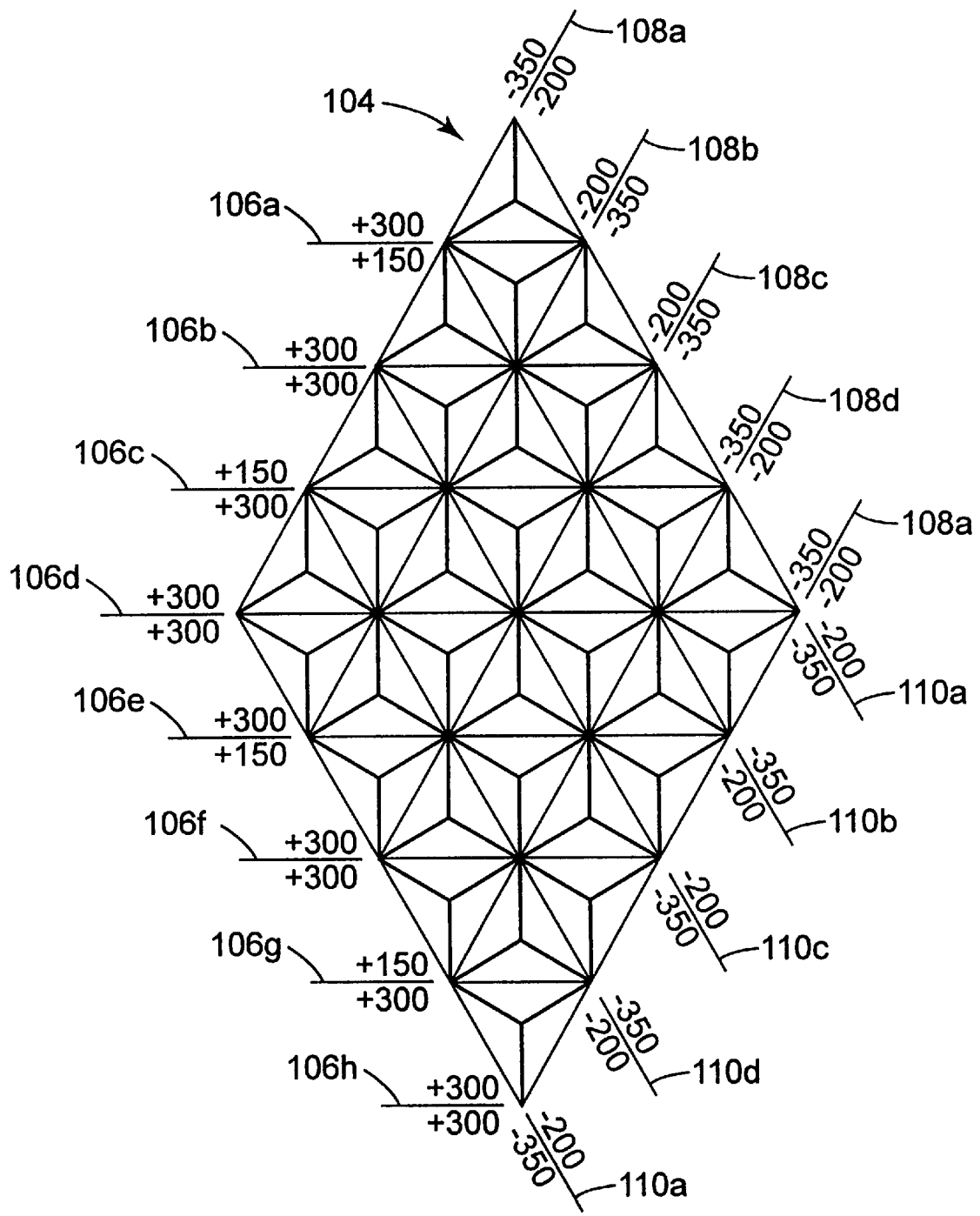
FIG. 17 is a magnified plan view of a portion of a structured surface incorporating a variety of reflective elements interspersed in a repeating pattern.

A portion 104 of a structured surface, illustrated in FIG. 17, is illustrative. A complete structured surface would be composed of duplicates of the portion 104 generated when the respective sequences of grooves 106a–h, 108a–d, and 110a–d are extended and repeated across the surface. The groove sets 106, 108, 110 intersect each other at 60 degrees. Groove side angle deviations are depicted for each labeled groove in FIG. 17 and are given in minutes of arc. The groove side angle pairs associated with a sequence of grooves in a groove set are different. For example, the pair {−350,−200} for groove 108a is different from the pair {−200,−350} for grooves 108b and 108c. Or again, the pair {300,150} for groove 106a is different from the pair {300, 300} for groove 106b which in turn is different from pair {150,300} for groove 106c. With the pattern so defined, six different types of reflective elements, each type having a different set of dihedral angles than the other types, are formed. The different combinations of groove side angle surfaces are listed in Table 5 along with the associated dihedral angles. The six reflective element types are assigned labels A through F.

TABLE 5

| GROOVE SIDE ANGLE DEVIATION (IN MINUTES OF ARC) | | | DIHEDRAL ANGLE DEVIATION FROM 90 DEGREES (IN DEGREES OF ARC) | | | |
|---|---|---|---|---|---|---|
| Groove set 106 | Groove set 108 | Groove set 110 | Grooves 108/110 | Grooves 106/110 | Grooves 106/108 | TYPE |
| +300 | −200 | −350 | −6.2975 | −0.843 | +1.033 | A |
| +300 | −350 | −350 | −7.922 | −0.843 | −0.843 | B |
| +300 | −350 | −200 | −6.2975 | +1.033 | −0.843 | A |
| +300 | −200 | −200 | −4.6115 | +1.033 | +1.033 | C |
| +150 | −350 | −350 | −7.922 | −2.4835 | −2.4835 | D |
| +150 | −200 | −200 | −4.6115 | −0.6618 | −0.6618 | E |

TABLE 5-continued

| GROOVE SIDE ANGLE DEVIATION (IN MINUTES OF ARC) | | | DIHEDRAL ANGLE DEVIATION FROM 90 DEGREES (IN DEGREES OF ARC) | | | |
|---|---|---|---|---|---|---|
| Groove set 106 | Groove set 108 | Groove set 110 | Grooves 108/110 | Grooves 106/110 | Grooves 106/108 | TYPE |
| +150 | −200 | −350 | −6.2975 | −2.4835 | −0.6618 | F |
| +150 | −350 | −200 | −6.2975 | −0.6618 | −2.4835 | F |

Figure 18:
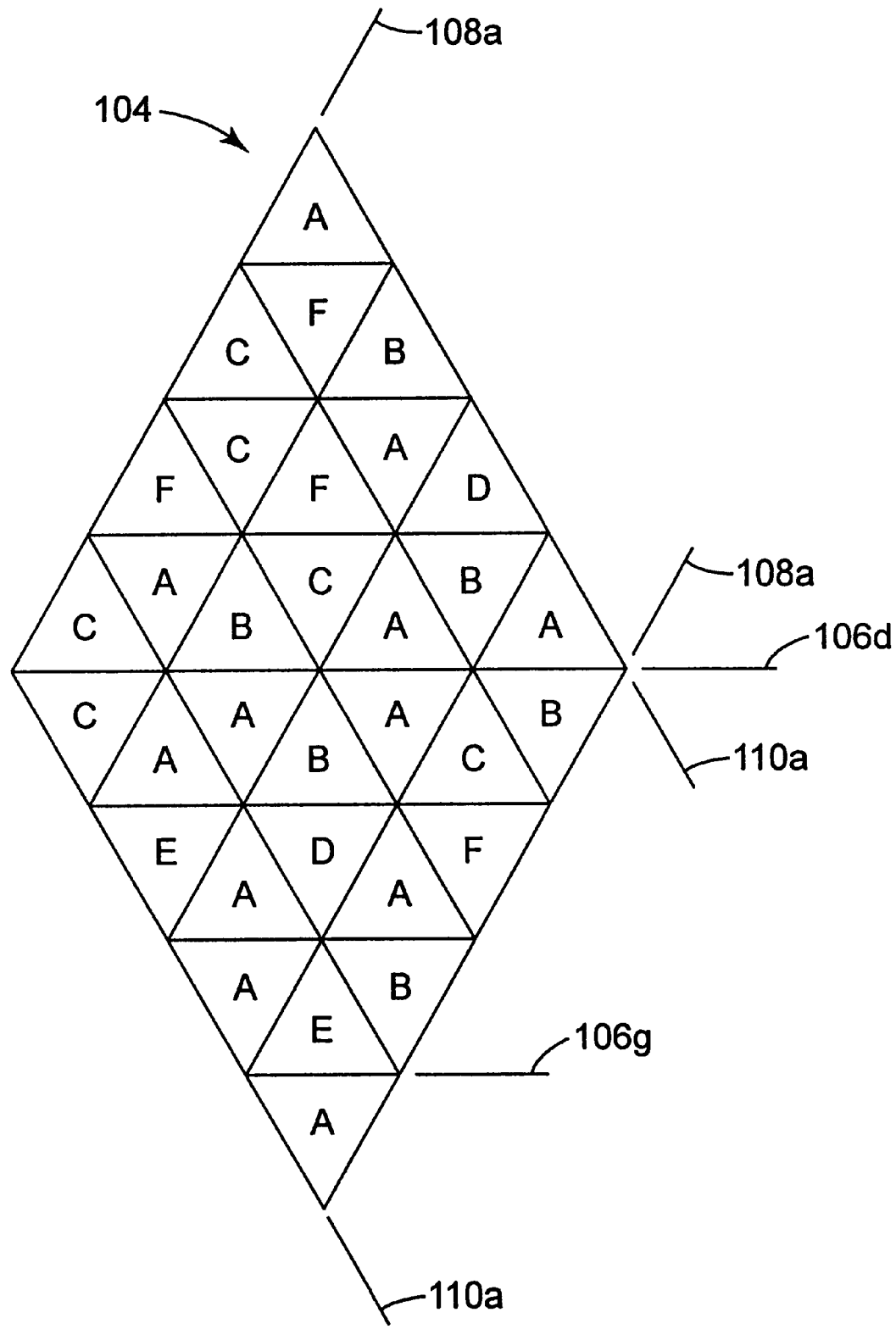
FIG. 18 is a simplified version of the view of FIG. 17, identifying different types of reflective elements.

The different classes of reflective elements A–F are arranged on structured surface portion 104 as shown in the simplified view of FIG. 18, where groove side surfaces are not shown. It should be noted that there are more than six different kinds of reflective elements on portion 104 if shape and orientation of the individual reflective elements are considered. For example, although all of the elements labeled "A" in FIG. 18 have the same three dihedral angles shown in Table 5, some of those elements are rotated with respect to others, and some are mirror images of others (but are not congruent to each other).

Figure 19:
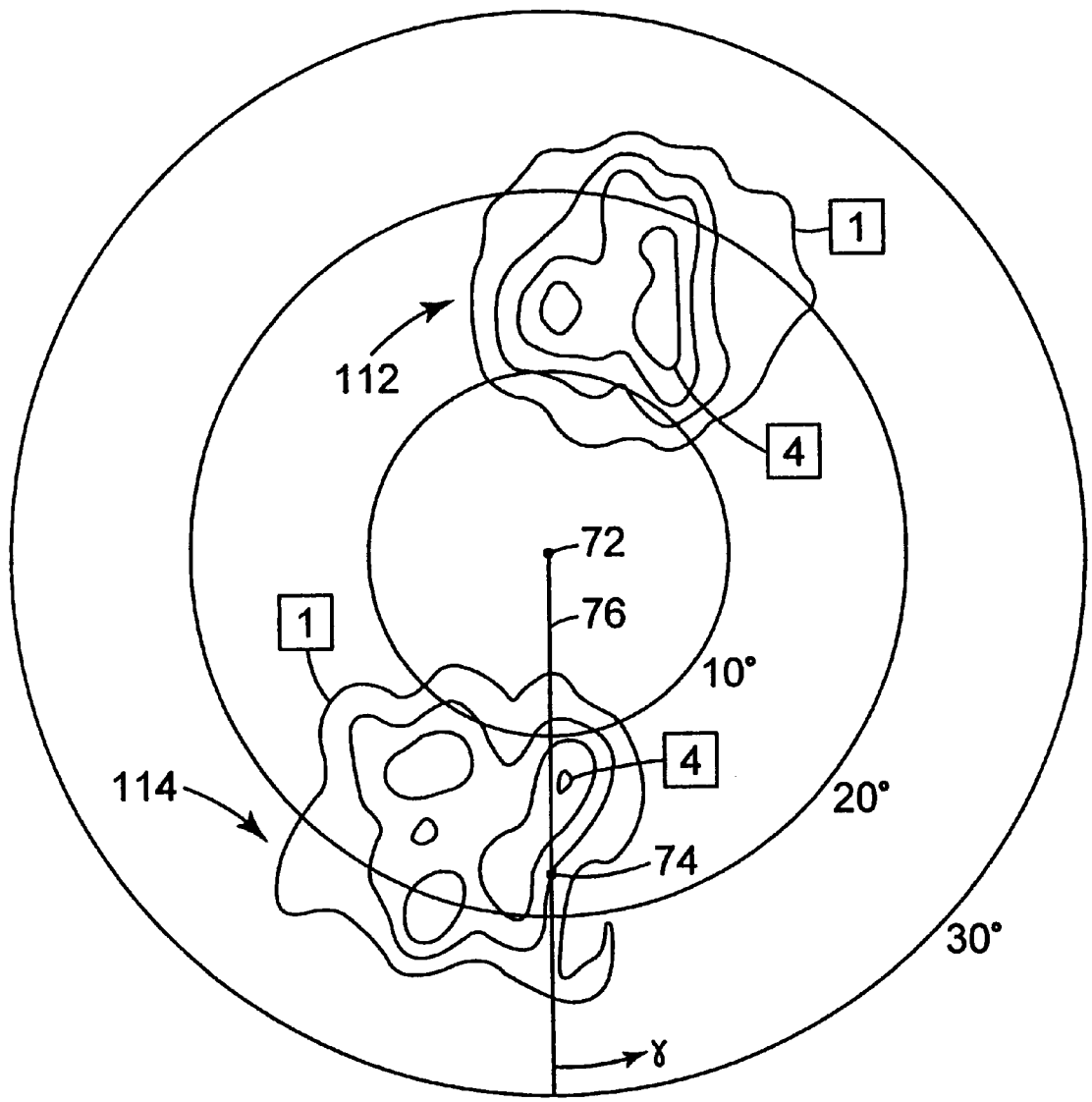
FIG. 19 is a plot of predicted divergence profile for an article having the structured surface of FIG. 17 as a rear surface.

Structured surface portion 104 has a divergence profile which is a combination of the divergence profiles of the many different reflective elements comprising it. The divergence profile was calculated using the previously mentioned computer model for a sheeting having as a rear surface the structured surface of FIG. 17, assuming: a groove spacing of 0.001 inches (25.4 μm) for all of the groove sets; an optical wavelength of ~555 nm and a refractive index of 1.6; and illumination geometry $\beta=\omega=18$ degrees. The result is shown in FIG. 19, where reference numerals 72, 74, and 76 have the same meanings as before. Two reflected beams, designated 112 and 114, are again seen on opposite sides of the retroreflection point 72. The peak brightness of both beams is relatively low (slightly above 4 cd/lx/m$^2$) compared with predicted results shown for some of the previously described embodiments. However, beams 112,114 are generally more uniform than such previous embodiments and have a more rounded (less elongated) shape, at least at a brightness level of 1 to 2 cd/lx/m$^2$. The more rounded beam shape means that sheeting having the structured surface 104 can illuminate a bigger viewing zone than a sheeting having a more elongated reflected beam. It also means that widely separated portions of a large sheet will have about the same apparent brightness at a given observation point, even though the separated portions are at substantially different entrance angles and/or orientation angles with respect to the light source. It should also be noted from FIG. 19 that even though beams 112,114 exhibit certain shape asymmetries relative to each other, the overall similarity of the beam shapes is surprising.

The structured surface of FIG. 17, and like surfaces, can be incorporated in a dual use sheeting or other article by the tiling techniques discussed above.

Glossary of Certain Terms

Beam: a quantity of light or region of reflectivity characterized by having a peak brightness and dropping below a given threshold such as 1% to 10% of the peak brightness beyond a bounded region characterizable as a beam outline.

Brightness: when referring to a beam of light, the amount of light expressed in candelas per square meter (cd/m$^2$). When referring to a reflective article, the reflectance of the article, i.e., the reflected luminous intensity of the article divided by the normal illuminance and by the surface area of the article, expressed in candelas per lux per square meter and abbreviated cd/(lx·m$^2$) or cd/lx/m$^2$. For light outside of the visible spectrum, corresponding quantities expressed in radiometric rather than photometric terms.

Datum Mark: a mark (whether real or hypothetical) on a reflective article that is used as a reference to indicate orientation about the reference axis.

Divergence Profile: a representation, for a given illumination geometry, of the brightness of reflected light as a function of observation angle and presentation angle. Ordinarily, the representation takes the form of isobrightness contours plotted in (r,theta) polar coordinates with the r coordinate representing observation angle $\alpha$ and the theta coordinate representing presentation angle $\gamma$.

Entrance Angle ($\beta$): the angle between the illumination axis and the reference axis.

Entrance Half-Plane: a half-plane which originates on the reference axis and contains the illumination axis.

Groove Side Angle: the dihedral angle between a groove side and a plane extending parallel to the length of the groove and perpendicular to a base surface of the reflective article.

Illumination Axis: a line segment extending between the reference center and the source of illumination.

Light: electromagnetic radiation, whether in the visible, ultraviolet, or infrared portion of the spectrum.

Observation Angle ($\alpha$): the angle between the illumination axis and the observation axis.

Observation Axis: a line segment extending between the reference center and a selected observation point.

Observation Half-Plane: a half-plane which originates on the illumination axis and contains the observation axis.

Orientation Angle ($\omega$): the dihedral angle between the entrance half-plane and a half-plane originating on the reference axis and containing the datum mark.

Presentation Angle ($\gamma$): the dihedral angle between the entrance half-plane and the observation half-plane.

Reference Axis: a line segment extending from the reference center away from the reflective article, and which is ordinarily perpendicular to the reflective article at the reference center.

Reference Center: a point on or near a reflective article which is designated to be the center of the article for specifying its performance.

Visible Light: light detectable by the unaided human eye, generally in the wavelength range of about 400 to 700 nm.

All U.S. patents and patent applications referred to herein are incorporated by reference. Although the present invention has been described with reference to preferred embodiments, workers skilled in the art will recognize that changes can be made in form and detail without departing from the spirit and scope of the invention.

What is claimed is:

1. A dual use reflective article comprising a layer having a structured surface, the structured surface including a first and second array of reflective elements, the first array comprising elements which have at least a first, second, and third reflecting face arranged to retroreflect incident light in a retroreflected beam within about a 2 degree observation angle, the second array comprising elements which have at least a fourth, fifth, and sixth reflecting face arranged to reflect incident light in a second beam at an observation angle greater than 2 degrees.

2. The article of claim 1, wherein the structured surface has a plurality of tiled areas thereon, the first array disposed in a first set of tiled areas and the second array disposed in a second set of tiled areas.

3. The article of claim 2, wherein the plurality of tiled areas have a width of no more than about 50 mm.

4. The article of claim 1, wherein the fourth, fifth, and sixth reflecting faces have definable dihedral angles therebetween, at least one of the dihedral angles differing from a right angle by more than two degrees.

5. The article of claim 4, wherein the at least one of the dihedral angles differs from a right angle by no more than about ten degrees.

6. The article of claim 1, wherein the structured surface further includes a third array of reflective elements different from the elements of the second array, the third array comprising reflective elements having a seventh, eighth, and ninth reflecting face arranged to reflect incident light in a third beam at an observation angle greater than 2 degrees.

7. The article of claim 6, wherein the structured surface has a plurality of tiled areas thereon, the first, second, and third arrays disposed in a first, second, and third set respectively of tiled areas.

8. The article of claim 1, wherein the fourth, fifth, and sixth reflecting faces are arranged such that the second beam has a beam width greater than a beam width of the retroreflected beam, where beam widths are measured at a level of 10% of the respective beam peak brightnesses.

9. The article of claim 1, wherein the retroreflected beam and the second beam are nonoverlapping at a brightness level of 2 cd/lx/m$^2$.

10. The article of claim 1, wherein the fourth, fifth, and sixth reflecting faces are arranged to reflect light incident from an angle of incidence between 18 and 26 degrees into the second beam such that the second beam has an observation angle beam width $\Delta\alpha$ of greater than 5 degrees and less than 20 degrees.

11. The article of claim 10, wherein the beam width is measured at a brightness level of 2 cd/lx/m$^2$.

12. The article of claim 10, wherein $\Delta\alpha$ is between 10 and 15 degrees.

13. The article of claim 1, wherein at least the elements of the second array are bounded by a plurality of groove sets.

14. The article of claim 13, wherein at least one of the groove sets has a groove spacing between about 10 and 50 $\mu$m.

15. The article of claim 13, wherein at least one of the groove sets has a sequence of grooves having different pairs of groove side angles.

16. The article of claim 15, wherein each of the plurality of groove sets has a sequence of grooves having different pairs of groove side angles.

17. The article of claim 1, wherein at least the elements of the second array comprise solid prisms formed in the layer, the fourth, fifth, and sixth reflecting faces being exposed to air to permit total internal reflection at such faces.

18. The article of claim 1, wherein reflective elements having the same dihedral angles are referred to as a class of reflective element, and wherein the reflective elements of the second array include at least three different classes of reflective elements.

19. The article of claim 18, wherein the different classes of reflective elements are individually interspersed with each other.

20. In an arrangement for displaying information in an extended observation zone, comprising:

a sign positionable proximate the extended observation zone; and a stationary light source illuminating the sign at an oblique angle;

the improvement wherein the sign comprises the reflective article of claim 1.

21. The arrangement of claim 20, wherein the second array reflects light from the stationary light source into a reflected beam encompassing the extended observation zone and omitting the stationary light source.

* * * * *

UNITED STATES PATENT AND TRADEMARK OFFICE
CERTIFICATE OF CORRECTION

PATENT NO.   : 6,120,879
DATED        : September 19, 2000
INVENTOR(S)  : Szczech, Theodore J.

It is certified that error appears in the above-identified patent and that said Letters Patent is hereby corrected as shown below:

Column 1,
Line 12, delete "it)" and insert in place thereof -- situations --.
Line 67, delete "ol" and insert in place thereof -- of --.

Column 2,
Line 6, delete "bean 24" and insert in place thereof -- beam --.
Line 64, delete "ol" and insert in place thereof -- of --.

Column 4,
Line 50, delete "ol" and insert in place thereof -- of --.

Column 5,
Line 5, delete "an(d" and insert in place thereof -- and --.

Column 6,
Line 25, delete "112" and insert in place thereof -- H2 --.
Line 51, delete "ox" and insert in place thereof -- α --.

Signed and Sealed this

Twenty-seventh Day of May, 2003

JAMES E. ROGAN
*Director of the United States Patent and Trademark Office*